(12) United States Patent
Nakano et al.

(10) Patent No.: US 8,952,083 B2
(45) Date of Patent: Feb. 10, 2015

(54) FLUOROCOPOLYMER COMPOSITION AND ITS PRODUCTION PROCESS

(75) Inventors: Takashi Nakano, Tokyo (JP); Tomoyuki Fujita, Tokyo (JP); Yoshitomi Morizawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/070,572

(22) Filed: Mar. 24, 2011

(65) Prior Publication Data

US 2011/0172336 A1    Jul. 14, 2011

Related U.S. Application Data

(63) Continuation of application No. PCT/JP2009/067781, filed on Oct. 14, 2009.

(30) Foreign Application Priority Data

Oct. 16, 2008  (JP) ................................. 2008-266936
Jul. 1, 2009   (JP) ................................. 2009-156740

(51) Int. Cl.
| | | |
|---|---|---|
| C08K 5/34 | (2006.01) | |
| C08F 214/18 | (2006.01) | |
| C08F 214/26 | (2006.01) | |
| C08J 3/09 | (2006.01) | |
| C08J 5/18 | (2006.01) | |
| C09D 127/12 | (2006.01) | |
| C09D 127/18 | (2006.01) | |
| C08K 5/00 | (2006.01) | |

(52) U.S. Cl.
CPC ............ *C08F 214/18* (2013.01); *C08F 214/26* (2013.01); *C08F 214/265* (2013.01); *C08J 3/093* (2013.01); *C08J 5/18* (2013.01); *C09D 127/12* (2013.01); *C09D 127/18* (2013.01); *C08J 2327/18* (2013.01); *C08K 5/0008* (2013.01)
USPC ............ 524/99; 524/288; 524/462; 524/260; 524/341; 524/359; 524/366; 524/373; 524/172; 524/208; 524/335; 524/158

(58) Field of Classification Search
USPC ......... 524/208, 462, 288, 260, 341, 359, 366, 524/373, 172, 99, 335, 158
See application file for complete search history.

(56) References Cited

U.S. PATENT DOCUMENTS

| 2,412,960 | A | 12/1946 | Berry | |
|---|---|---|---|---|
| 2,448,952 | A | 9/1948 | Berry | |
| 2,484,483 | A | 10/1949 | Berry | |
| 4,933,388 | A | 6/1990 | Blickle et al. | |
| 5,532,310 | A * | 7/1996 | Grenfell et al. | ............... 524/463 |
| 7,247,238 | B2 | 7/2007 | Mullette et al. | |
| 2004/0106732 | A1* | 6/2004 | Tsuji et al. | ...................... 525/94 |
| 2004/0236020 | A1* | 11/2004 | Tsuji et al. | ...................... 525/99 |
| 2009/0291219 | A1* | 11/2009 | Larichev | .................... 427/385.5 |
| 2010/0009197 | A1* | 1/2010 | Jing et al. | ........................ 428/422 |
| 2010/0076159 | A1* | 3/2010 | Apostolo et al. | ........... 525/326.3 |
| 2010/0222491 | A1* | 9/2010 | Sawauchi et al. | ............. 524/505 |

FOREIGN PATENT DOCUMENTS

| JP | 6-240042 | 8/1994 |
|---|---|---|
| JP | 2000-503731 | 3/2000 |
| JP | 2001-272504 | 10/2001 |
| JP | 2008-24748 | 2/2008 |
| WO | WO 2008/048884 A2 | 4/2008 |

OTHER PUBLICATIONS

International Search Report issued Jan. 19, 2010 in PCT/JP09/067781 filed Jan. 6, 2010.
U.S. Appl. No. 13/071,720, filed Mar. 25, 2011, Iruya, et al.
U.S. Appl. No. 13/342,542, filed Jan. 3, 2012, Nakano, et al.
U.S. Appl. No. 13/610,213, filed Sep. 11, 2012, Nakano.
U.S. Appl. No. 13/613,014, filed Sep. 13, 2012, Nakano, et al.
U.S. Appl. No. 13/618,460, filed Sep. 14, 2012, Nakano, et al.
Extended European Search Report issued Mar. 8, 2012 in patent application No. 09820599.0.

* cited by examiner

*Primary Examiner* — Peter D Mulcahy
(74) *Attorney, Agent, or Firm* — Oblon, Spivak, McClelland, Maier & Neustadt, L.L.P.

(57) ABSTRACT

To provide a composition comprising a fluorocopolymer such as an ethylene/tetrafluoroethylene copolymer which can be produced at a relatively low temperature, and its production process.
A fluorocopolymer composition which comprises a fluorocopolymer such as an ethylene/tetrafluoroethylene copolymer and a fluorinated aromatic compound having a melting point of at most 230° C. and having a fluorine content in the compound of from 5 to 75 mass %, and is in a solution state at a temperature of at most the melting point of the fluorocopolymer, and a process for producing the fluorocopolymer composition, which comprises a step of dissolving the fluorocopolymer in a solvent containing the fluorinated aromatic compound at a temperature of at most the melting point of the fluorocopolymer.

20 Claims, 2 Drawing Sheets

FLUOROCOPOLYMER COMPOSITION AND ITS PRODUCTION PROCESS

TECHNICAL FIELD

The present invention relates to a fluorocopolymer composition and its production process.

BACKGROUND ART

A fluororesin is excellent in the solvent resistance, low dielectric properties, a low surface energy, non-adhesiveness and the weather resistance, and accordingly used for various applications for which a general purpose plastic cannot be used. Particularly, an ethylene/tetrafluoroethylene copolymer (hereinafter tetrafluoroethylene will sometimes be referred to as TFE, and an ethylene/tetrafluoroethylene copolymer as ETFE) is a fluororesin excellent in the heat resistance, the flame retardancy, the chemical resistance, the weather resistance, the low friction property, low dielectric properties, the transparency, etc. and is thereby used in a wide range of fields, such as a covering material for a heat resistant electric wire, a corrosion-resistant piping material for a chemical plant, an agricultural plastic greenhouse material, and a mold release film.

However, unlike polyvinylidene fluoride which is soluble in N-methylpyrrolidone and the like, ETFE is usually insoluble in a solvent and cannot be applied to formation of a thin film e.g. by coating, and accordingly its forming method is limited to melt forming such as extrusion, injection molding or powder coating.

Heretofore, an attempt to obtain a solution of ETFE has been reported. An ETFE solution was obtained by using as a solvent a dicarboxylic diester such as diisobutyl adipate, however, the dissolution temperature must be a high temperature of 230° C., 260 to 265° C. or 290° C. (Patent Documents 1 to 3). Further, an example of using a low molecular weight chlorotrifluoroethylene polymer as a solvent has also been reported, but heating to a temperature in the vicinity of the melting point of the polymer is still required. Further, it is disclosed that the solution can hardly be used for coating since the boiling point of the solvent is high, and that a dispersion liquid obtainable from the solvent loses fluidity in the vicinity of room temperature (Patent Document 4). On the other hand, an example has been reported that ETFE is utilized for flash spinning using a ketone, a hydrofluorocarbon or the like as a solvent under high temperature and high pressure conditions. However, any attempt is carried out under very high pressure conditions of at least 13 MPa, and accordingly a special apparatus is required, and application other than the aimed purpose is difficult, and for example, it is impossible to apply such an attempt to production of a thin film, a film, a porous material such as a hollow fiber (Patent Document 5).

Accordingly, examples in the past are hardly easily conductible in practical operation, and an easily handleable technique or method to obtain a solution of ETFE at a relatively low temperature has not been known.

Patent Document 1: U.S. Pat. No. 2,412,960
Patent Document 2: U.S. Pat. No. 2,448,952
Patent Document 3: U.S. Pat. No. 2,484,483
Patent Document 4: U.S. Pat. No. 4,933,388
Patent Document 5: JP-A-2000-503731

DISCLOSURE OF THE INVENTION

Object to be Accomplished by the Invention

Under these circumstances, it is an object of the present invention to provide a composition of a fluorocopolymer having repeating units based on ethylene and TFE, from which production of a thin film by coating and a fluorocopolymer porous material having high strength and a homogenous pore size are possible, and which can be produced at a relatively low temperature, and a process for producing such a fluorocopolymer composition at a relatively low temperature.

Means to Accomplish the Object

The present invention provides the following fluorocopolymer composition and process for producing it.

[1] A fluorocopolymer composition which comprises a fluorocopolymer having repeating units based on ethylene and repeating units based on tetrafluoroethylene, and a fluorinated aromatic compound having a melting point of at most 230° C. and having a fluorine content in the compound of from 5 to 75 mass %, and has a temperature range within which the composition is in a solution state at least at a temperature of at most the melting point of the fluorocopolymer.

[2] The fluorocopolymer composition according to the above [1], wherein the content of the fluorocopolymer is from 0.1 to 80 mass % to the total amount of the composition.

[3] The fluorocopolymer composition according to the above [1] or [2], wherein the fluorinated aromatic compound is a compound represented by the following formula (I):

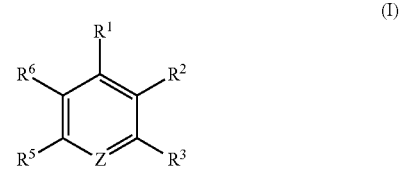

in the formula (I), Z is N or $CR^4$, and each of $R^1$ to $R^6$ (excluding $R^4$ when Z is N) which are independent of one another, is a hydrogen atom, a halogen atom, —$X^1$, —CN, —$NO_2$, —$NX^2{}_2$, —COOH, —$COOX^3$, —CHO, —$COX^4$, —OH, —$OX^5$, —OCOH, —$OCOX^6$, —$SO_2OH$—, —$SO_2Cl$, —$SO_2F$, —$SO_2H$, —$SO_2X^7$, —$SF_5$, —$OSO_2X^8$ or —$OCOOX^9$; wherein each of $X^1$ to $X^9$ which are independent of one another, is a $C_{1-20}$ alkyl group, an alkenyl group or an alkynyl group, which may be substituted by a halogen group or a hydroxy group, and in which optional —$CH_2$— except for the terminal may be substituted by an oxygen atom, or a phenyl group which may be substituted by a group selected from the above alkyl group, the above alkenyl group, the above alkynyl group and a halogen group; provided that adjacent two among $R^1$ to $R^6$ (excluding $R^4$ when Z is N) may be bonded to form a 5- or 6-membered ring which may be substituted by a group selected from the above alkyl group, the above alkenyl group, the above alkynyl group and a halogen group, and in such a case, the ring may contain a hetero atom selected from an oxygen atom, a nitrogen atom and a sulfur atom as an atom constituting the ring; and the formula (I) has at least one fluorine atom.

[4] The fluorocopolymer composition according to the above [3], wherein the fluorinated aromatic compound is a compound of the above formula (I), wherein Z is N or $CR^4$, and each of $R^1$ to $R^6$ (excluding $R^4$ when Z is N) which are independent of one another, is a hydrogen atom, a fluorine atom, a chlorine atom, —$X^1$, —CN, —$NO_2$, —COOH, —$COOX^3$, —$COX^4$, —$OX^5$, —$OCOX^6$, —$SO_2Cl$, —$SF_5$, —$OSO_2X^5$ or —$OCOOX^9$, or adjacent two among them are bonded to form a 6-membered aromatic ring (wherein each of $X^1$ to $X^9$ excluding $X^2$ and $X^7$ which are independent of one another, is a $C_{1-20}$ alkyl group which may be substituted by a halogen group or a hydroxy group, in which optional —$CH_2$— except for the terminal may be substituted by an oxygen atom, or a phenyl group which may be substituted by a group selected from the above alkyl group and a halogen group; the aromatic ring formed by the adjacent two may be substituted by a group selected from the above alkyl group and a halogen group); and is a compound having at least two fluorine atoms in the formula (I).

[5] The fluorocopolymer composition according to the above [1] or [2], wherein the fluorinated aromatic compound is at least one member selected from the group consisting of a fluorinated benzonitrile, a fluorinated benzoic acid and its ester, a fluorinated polycyclic aromatic compound, a fluorinated nitrobenzene, a fluorinated phenyl alkyl alcohol, a fluorinated phenol and its ester, a fluorinated aromatic ketone, a fluorinated aromatic ether, a fluorinated aromatic sulfonyl compound, a fluorinated pyridine compound, a fluorinated aromatic carbonate, a perfluoroalkyl-substituted benzene, perfluorobenzene, a polyfluoroalkyl ester of benzoic acid, a polyfluoroalkyl ester of phthalic acid, and an aryl ester of trifluoromethanesulfonic acid.

[6] The fluorocopolymer composition according to the above [1] or [2], wherein the fluorinated aromatic compound is at least one member selected from the group consisting of a fluorinated benzonitrile, a fluorinated benzoic acid and its ester, a fluorinated polycyclic aromatic compound, a fluorinated nitrobenzene, a fluorinated phenyl alkyl alcohol, an ester of a fluorinated phenol, a fluorinated aromatic ketone, a fluorinated aromatic ether, a fluorinated aromatic sulfonyl compound, a fluorinated pyridine compound, a fluorinated aromatic carbonate, a perfluoroalkyl-substituted benzene, perfluorobenzene, a polyfluoroalkyl ester of benzoic acid, a polyfluoroalkyl ester of phthalic acid, and an aryl ester of trifluoromethanesulfonic acid, each having at least two fluorine atoms.

[7] The fluorocopolymer composition according to any one of the above [1] to [6], which further contains an organic solvent other than the fluorinated aromatic compound.

[8] A process for producing the fluorocopolymer composition as defined in any one of the above [1] to [7], which comprises a step of dissolving the fluorocopolymer having repeating units based on ethylene and repeating units based on tetrafluoroethylene, in the fluorinated aromatic compound or a mixed organic solvent containing the fluorinated aromatic compound, at a temperature of at most the melting point of the fluorocopolymer.

[9] The process for producing the fluorocopolymer composition according to the above [8], wherein the temperature is a temperature lower than the melting point of the fluorocopolymer by at least 30° C.

[10] A thin film made of a fluorocopolymer, formed by using the fluorocopolymer composition as defined in any one of the above [1] to [7].

Effects of the Invention

According to the present invention, it is possible to produce a fluorocopolymer composition having repeating units based on ethylene and TFE at a relatively low temperature. Further, by using the fluorocopolymer composition of the present invention having repeating units based on ethylene and TFE, it is possible to form various formed products such as a thin film, a film and a tube.

BEST MODE FOR CARRYING OUT THE INVENTION

Figure 1:
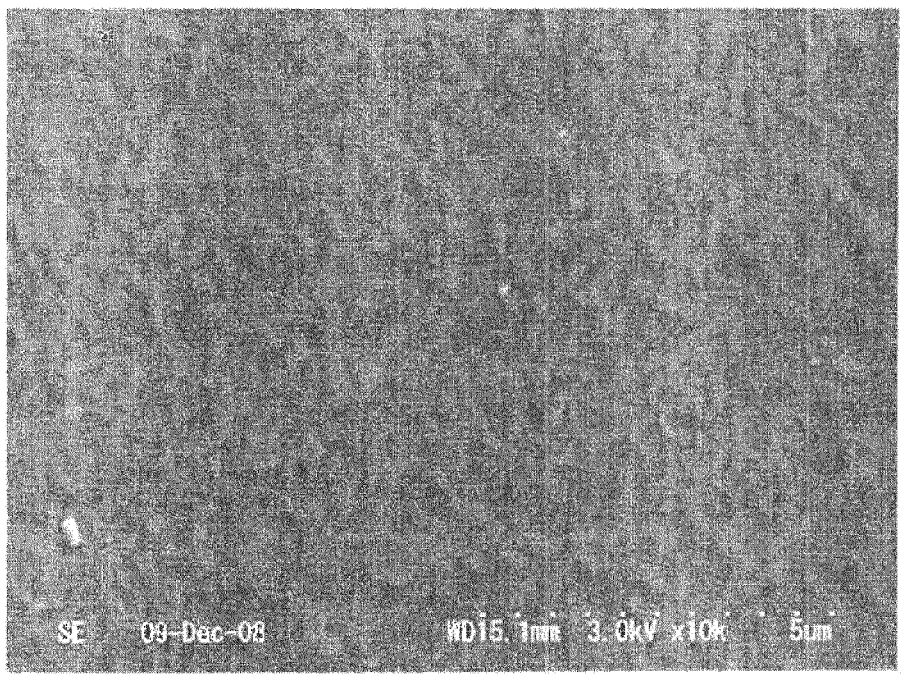
FIG. 1 is a scanning electron micrograph (10,000 magnifications) of the surface of an ETFE thin film obtained in Application Example 1 using the fluorocopolymer composition of the present invention.

Now, the embodiment of the present invention will be described in detail below.

First, a fluorocopolymer composition which comprises a fluorocopolymer having repeating units based on ethylene and repeating units based on tetrafluoroethylene, and a fluorinated aromatic compound having a melting point of at most 230° C. and having a fluorine content in the compound of from 5 to 75 mass %, and has a temperature range within which the composition is in a solution state at least at a temperature of at most the melting point of the fluorocopolymer, will be described.

The fluorocopolymer in the composition of the present invention is not particularly limited so long as it is a fluorocopolymer having repeating units based on ethylene and repeating units based on tetrafluoroethylene. Such a fluorocopolymer may, for example, be specifically an ETFE having as main repeating units in the copolymer repeating units based on ethylene and repeating units based on tetrafluoroethylene ($CF_2$=$CF_2$:TFE).

The ETFE in the present invention may, for example, be one having a molar ratio of repeating units based on TFE/repeating units based on ethylene of preferably from 70/30 to 30/70, more preferably from 65/35 to 40/60, most preferably from 60/40 to 40/60.

Further, the ETFE in the present invention may have, in addition to repeating units based on TFE and ethylene, repeating units based on another monomer. Such another monomer may, for example, be a fluoroethylene (excluding TFE) such as $CF_2$=CFCl or $CF_2$=$CH_2$; a fluoropropylene such as $CF_2$=$CFCF_3$ or $CF_2$=$CHCF_3$; a (polyfluoroalkyl)ethylene having a $C_{2-12}$ fluoroalkyl group such as $CF_3CF_2CH$=$CH_2$, $CF_3CF_2CF_2CF_2CH$=$CH_2$, $CF_3CF_2CF_2CF_2CF$=$CH_2$ or $CF_2HCF_2CF_2CF$=$CH_2$; a perfluorovinyl ether such as $R^f$(OCFXCF$_2$)$_m$OCF=$CF_2$ (wherein $R^f$ is a $C_{1-6}$ perfluoroalkyl group, X is a fluorine atom or a trifluoromethyl group, and m is an integer of from 0 to 5); a perfluorovinyl ether having a group capable of being readily converted to a carboxylic acid group or a sulfonic acid group, such as $CH_3C$(=O)$CF_2CF_2CF_2OCF$=$CF_2$ or $FSO_2CF_2CF_2OCF(CF_3)CF_2OCF$=$CF_2$; or an olefin (excluding ethylene) such as a C3 olefin having 3 carbon atoms such a propylene or a C4 olefin having 4 carbon atoms such as butylene or isobutylene. Such comonomers may be used alone or in combination of two or more.

Further, as another monomer which the ETFE used for the fluorocopolymer composition of the present invention may contain, a monomer having a crosslinkable functional group may be mentioned. Such a monomer may, for example, be specifically itaconic anhydride, maleic anhydride, citraconic anhydride or 5-norbornene-2,3-dicarboxylic anhydride, which undergoes curing/crosslinking by reaction with a crosslinking agent.

In a case where the above ETFE has such repeating units based on a comonomer other than TFE and ethylene, the ratio is preferably at most 30 mol %, more preferably from 0.1 to 15 mol %, most preferably from 0.2 to 10 mol %, based on all the repeating units in the ETFE.

In the composition of the present invention, as the above fluorocopolymer, it is possible to use one obtained by copolymerizing ethylene and TFE which are essential comonomers in preparation of such a fluorocopolymer, and the above-described another comonomer which may optionally be contained, by a conventional method, or it is possible to use a commercially available product. As such a commercially available fluorocopolymer product, for example, the ETFE may, for example, be Fluon (trademark) ETFE Series or Fluon (trademark) LM Series manufactured by Asahi Glass Company, Limited, NEOFLON (trademark) manufactured by DAIKIN INDUSTRIES, LTD., Dyneon (trademark) ETFE manufactured by Dyneon or Tefzel (trademark) manufactured by DuPont. Further, the melting point of the ETFE used for the composition of the present invention is not particularly limited, but in view of the solubility, the strength, etc. it is preferably from 130° C. to 275° C., more preferably from 140° C. to 265° C., most preferably from 150° C. to 260° C.

In the fluorocopolymer composition of the present invention, one of such fluorocopolymers alone or a mixture of two or more may be contained.

In the fluorocopolymer composition of the present invention, the content of the fluorocopolymer is not particularly limited, but is preferably from 0.1 to 80 mass % to the total amount of the composition, from the viewpoint of forming properties when the composition is used to obtain a formed product. For example, in a case where the fluorocopolymer composition of the present invention is used to obtain a thin film, the content of the fluorocopolymer in the composition is preferably from 0.1 to 30 mass %, more preferably from 0.5 to 10 mass %, most preferably from 1 to 5 mass %, to the total amount of the composition. When the content is within such a range, handling efficiency e.g. at the time of coating in preparation of a thin film will be excellent, and a homogenous thin film made of the fluorocopolymer can be obtained. Further, in a case where the fluorocopolymer composition of the present invention is used to obtain a fluorocopolymer porous material for which no support material is used at the time of forming, such as a tube, the content of the fluorocopolymer in the composition is preferably from 5 to 80 mass %, more preferably from 10 to 60 mass %, to the total amount of the composition. When the content is within such a range, the composition will be excellent in forming properties into a formed product such as a film or a hollow fiber, and from the obtained formed product, a high strength fluorocopolymer porous material having a narrow pore size distribution will be obtained.

Now, the fluorinated aromatic compound in the composition of the present invention will be described.

The fluorinated aromatic compound in the present invention is a compound having a melting point of at most 230° C. and having a fluorine content in the compound ((fluorine atomic weight×number of fluorine atoms in the molecule)× 100/molecular weight) of from 5 to 75 mass %.

In the composition of the present invention, the fluorinated aromatic compound has a role to dissolve the above fluorocopolymer therein to obtain a composition, as described in the after-mentioned production process, and is preferably a liquid at room temperature. However, so long as the fluorinated aromatic compound to be used is a liquid at a temperature at which the above fluorocopolymer is soluble in the fluorinated aromatic compound, any fluorinated aromatic compound can be used without any problem in practice. Such a fluorinated aromatic compound has a melting point of at most 230° C.

Here, in this specification, the state of "a solution" in which the fluorocopolymer is "dissolved" in the fluorinated aromatic compound is a transparent and uniform state as visually observed after a mixture of the fluorocopolymer and the fluorinated aromatic compound is sufficiently mixed. This mixture is referred to as a solution in which the fluorocopolymer is dissolved in the fluorinated aromatic compound. Further, the "dissolution temperature" means a temperature measured by the following method. That is, the fluorocopolymer is added to the fluorinated aromatic compound, and the mixture is heated and its temperature is raised while a sufficiently mixed state is always kept e.g. by a stirring means, and whether the fluorocopolymer is dissolved or not is visually observed. First, a temperature at which the mixture is confirmed to be a transparent and uniform solution and completely dissolved, is confirmed. Then, the solution is once gradually cooled and a temperature at which the solution becomes turbid is confirmed, and then the mixture is reheated, and a temperature at which a transparent and uniform solution is obtained again, is regarded as the dissolution temperature.

Further, "a temperature range within which the composition is in a solution state" means a temperature range of at least the above dissolution temperature and less than the melting point of the fluorocopolymer.

If the melting point of the fluorinated aromatic compound exceeds 230° C., such a compound will not be a liquid at the dissolution temperature and therefore cannot be used. Further, the melting point of the fluorinated aromatic compound in the present invention is preferably at most 200° C., more preferably at most 180° C. When the melting point is within such a range, handling efficiency when the fluorocopolymer is dissolved will be excellent.

Further, if the fluorine content in the fluorinated aromatic compound is less than 5 mass % or exceeds 75 mass %, the fluorocopolymer cannot sufficiently be dissolved. The fluorine content in the fluorinated aromatic compound is preferably from 9 to 75 mass %, more preferably from 12 to 75 mass %. Within such a range, excellent solubility of the fluorocopolymer will be obtained.

The boiling point of the fluorinated aromatic compound in the fluorocopolymer composition of the present invention is preferably the same as or higher than the temperature at which the fluorocopolymer is dissolved in the fluorinated aromatic compound. However, in the present invention, in a case where dissolution of the fluorocopolymer is carried out under autogenous pressure or below, a fluorinated aromatic compound having a boiling point of at most the dissolution temperature is applicable. The "autogenous pressure" means a pressure which a mixture of the fluorinated aromatic compound and the fluorocopolymer spontaneously shows in a closed vessel. So long as the mixture of the aromatic compound and the fluorocopolymer reaches a predetermined temperature, the pressure at that time is not particularly limited. The upper limit of the boiling point of the fluorinated aromatic compound is not particularly limited, but is preferably at most 220° C. from the viewpoint of drying properties, etc., when the composition of the present invention is used for coating.

As a specific example of such a fluorinated aromatic compound of the present invention, a compound represented by the following formula (I) may be mentioned.

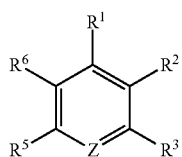
(I)

in the formula (I), Z is N or $CR^4$, and each of $R^1$ to $R^6$ (excluding $R^4$ when Z is N) which are independent of one another, is a hydrogen atom, a halogen atom, —$X^1$, —CN, —$NO_2$, —$NX^2_2$, —COOH, —$COOX^3$, —CHO, —$COX^4$, —OH, —$OX^6$, —OCOH, —$OCOX^6$, —$SO_2OH$—, —$SO_2Cl$, —$SO_2F$, —$SO_2H$, —$SO_2X^7$, —$SF_5$, —$OSO_2X^8$ or —$OCOOX^9$; wherein each of $X^1$ to $X^9$ which are independent of one another, is a $C_{1-20}$ alkyl group, an alkenyl group or an alkynyl group, which may be substituted by a halogen group or a hydroxy group, and in which optional —$CH_2$— except for the terminal may be substituted by an oxygen atom, or a phenyl group which may be substituted by a group selected from the above alkyl group, the above alkenyl group, the above alkynyl group and a halogen group; provided that adjacent two among $R^1$ to $R^6$ (excluding $R^4$ when Z is N) may be bonded to form a 5- or 6-membered ring which may be substituted by a group selected from the above alkyl group, the above alkenyl group, the above alkynyl group and a halogen group, and in such a case, the ring may contain a hetero atom selected from an oxygen atom, a nitrogen atom and a sulfur atom as an atom constituting the ring; and the formula (I) has at least one fluorine atom.

In the above $X^1$ to $X^9$, the structures of the $C_{1-20}$ alkyl group, alkenyl group and alkynyl group include branched and cyclic structures in addition to a linear structure.

Further, in the formula (I), a compound of a 5- to 6-membered ring formed by bonding of adjacent two among $R^1$ to $R^6$ (excluding $R^4$ when Z is N) means, as described with a cyclic structure as the main body, a compound having such a structure that the benzene ring represented in the formula (I) and another 5- to 6-membered monocyclic compound (which may form an aromatic ring after condensation) form a condensed ring with one side shared. Here, the number of members forming the ring of 5 or 6 is the number of members including atoms shared with the benzene ring shown in the formula (I). The ring formed by bonding of adjacent two among $R^1$ to $R^6$ (excluding $R^4$ when Z is N) such as an aromatic ring, may be substituted by a substituent as described above, or may contain a hetero atom selected from an oxygen atom, a nitrogen atom and a sulfur atom as an atom constituting the ring. In a case where the hetero atom is a nitrogen atom, the nitrogen atom constituting the ring may be bonded to a hydrogen atom.

Specifically, in a case where Z is $CR^4$, when one pair of adjacent two among $R^1$ to $R^6$ form a 6-membered aromatic ring, a naphthalene ring is formed as a basic skeleton of the entire compound. Similarly, when one pair of adjacent two form a 5-membered aromatic ring containing an oxygen atom or a 5-membered aromatic ring containing a sulfur atom, a benzofuran ring or a benzothiophene ring is formed. Further, formation of the ring such as an aromatic ring is not limited to one pair, and when two pairs located at facing two sides of the benzene ring respectively form a 6-membered aromatic ring, an anthracene ring is formed, and when two pairs located at two sides with one side interposed therebetween, respectively form a 6-membered aromatic ring, a phenanthrene ring is formed. When Z is N, adjacent two among $R^1$ to $R^6$ excluding $R^4$ are to form a ring such as an aromatic ring, and for example, when adjacent two form a 6-membered aromatic ring, a quinoline ring is formed.

As described above, in a case where the basic skeleton of the compound represented by the formula (I) is a condensed ring structure, as the condensed ring, in addition to the above, an indene ring, an indole ring or a chromene ring in a case where Z is $CR^4$, or an isoquinoline ring or a naphthyridine ring in a case where Z is N, may, for example, be mentioned.

The compound represented by the formula (I) has at least one fluorine atom, and has a fluorine content of from 5 to 75 mass %. In the formula (I), the position of the fluorine atom is not particularly limited. The fluorinated aromatic compound represented by the formula (I) may be used alone or in combination of two or more types.

Among the fluorinated aromatic compounds represented by the above formula (I) in the present invention, preferred is a compound of the above formula (I), wherein Z is N or $CR^4$, and each of $R^1$ to $R^6$ (excluding $R^4$ when Z is N) which are independent of one another, is a hydrogen atom, a fluorine atom, a chlorine atom, —$X^1$, —CN, —$NO_2$, —COOH, —$COOX^3$, —$COX^4$, —$OX^6$, —$OCOX^6$, —$SO_2Cl$, —$SF_5$, —$OSO_2X^8$ or —$OCOOX^9$, or adjacent two among them are bonded to form a 6-membered aromatic ring (wherein each of $X^1$ to $X^9$ excluding $X^2$ and $X^7$ which are independent of one another, is a $C_{1-20}$ alkyl group which may be substituted by a halogen group or a hydroxy group, in which optional —$CH_2$— except for the terminal may be substituted by an oxygen atom, or a phenyl group which may be substituted by a group selected from the above alkyl group and a halogen group; the aromatic ring formed by the adjacent two may be substituted by a group selected from the above alkyl group and a halogen group); and is a compound having at least two fluorine atoms in the formula (I).

In the preferred example of the compound represented by the formula (I), the number of fluorine atoms is at least two. However, needless to say, as described above, the number of fluorine atoms is within a range of the fluorine content of the fluorinated aromatic compound in the composition of the present invention. The positions of two fluorine atoms in the formula (I) are not particularly limited, but are preferably such that $R^1$ to $R^6$ (excluding $R^4$ when Z is N) are a fluorine atom or a group selected from —$R^F$, —$SF_5$, —$OR^F$, —$COR^F$, —$OCOOR^F$, —$OSO_2R^F$ and —$COOR^F$ (wherein $R^F$ is an alkyl group which may be branched or a phenyl group, substituted by a fluorine atom). Otherwise, in a case where adjacent two among $R^1$ to $R^6$ (excluding $R^4$ when Z is N) form an aromatic ring, a position of a fluorine atom such that the above aromatic ring is substituted by a fluorine atom is also preferred.

The fluorinated aromatic compound of the present invention may, for example, be specifically preferably at least one member selected from the group consisting of a fluorinated benzonitrile, a fluorinated benzoic acid and its ester, a fluorinated polycyclic aromatic compound, a fluorinated nitrobenzene, a fluorinated phenyl alkyl alcohol, a fluorinated phenol and its ester, a fluorinated aromatic ketone, a fluorinated aromatic ether, a fluorinated aromatic sulfonyl compound, a fluorinated pyridine compound, a fluorinated aromatic carbonate, a perfluoroalkyl-substituted benzene, perfluorobenzene, a polyfluoroalkyl ester of benzoic acid, a polyfluoroalkyl ester of phthalic acid, and an aryl ester of trifluoromethanesulfonic acid.

Still further, among them, it is more preferred to use a fluorinated benzonitrile, a fluorinated benzoic acid or its ester, a fluorinated polycyclic aromatic compound, a fluorinated nitrobenzene, a fluorinated phenyl alkyl alcohol, an ester of a fluorinated phenol, a fluorinated aromatic ketone, a fluorinated aromatic ether, a fluorinated aromatic sulfonyl compound, a fluorinated pyridine compound, a fluorinated aromatic carbonate, a perfluoroalkyl-substituted benzene, perfluorobenzene, a polyfluoroalkyl ester of benzoic acid, a polyfluoroalkyl ester of phthalic acid, or an aryl ester of trifluoromethanesulfonic acid, each having at least two fluorine atoms.

Now, more specific examples of the above-exemplified compounds will be described as a fluorinated aromatic compound preferred in the present invention.

Specific examples of the above fluorinated benzonitrile include pentafluorobenzonitrile, 2,3,4,5-tetrafluorobenzonitrile, 2,3,4,6-tetrafluorobenzonitrile, 2,3,5,6-tetrafluorobenzonitrile, 2,3,4-trifluorobenzonitrile, 2,3,5-trifluorobenzonitrile, 2,3,6-trifluorobenzonitrile, 2,4,5-trifluorobenzonitrile, 2,4,6-trifluorobenzonitrile, 3,4,5-trifluorobenzonitrile, 2,3-difluorobenzonitrile, 2,4-difluorobenzonitrile, 2,5-difluorobenzonitrile, 2,6-difluorobenzonitrile, 3,4-difluorobenzonitrile, 3,5-difluorobenzonitrile, 2-fluorobenzonitrile, 3-fluorobenzonitrile, 4-fluorobenzonitrile, 2,4-bis(trifluoromethyl)benzonitrile, 2,5-bis(trifluoromethyl)benzonitrile, 2,6-bis(trifluoromethyl)benzonitrile, 3,5-bis(trifluoromethyl)benzonitrile, 2-(trifluoromethyl)benzonitrile, 3-(trifluoromethyl)benzonitrile, 4-(trifluoromethyl)benzonitrile, 3-fluoro-2-(trifluoromethyl)benzonitrile, 4-fluoro-2-(trifluoromethyl)benzonitrile, 5-fluoro-2-(trifluoromethyl)benzonitrile, 2-fluoro-6-(trifluoromethyl)benzonitrile, 2-fluoro-3-(trifluoromethyl)benzonitrile, 4-fluoro-3-(trifluoromethyl)benzonitrile, 3-fluoro-5-(trifluoromethyl)benzonitrile, 2-fluoro-5-(trifluoromethyl)benzonitrile, 2-fluoro-4-(trifluoromethyl)benzonitrile, 3-fluoro-4-(trifluoromethyl)benzonitrile, (3-cyanophenyl)sulfur pentafluoride, (4-cyanophenyl)sulfur pentafluoride, 2-(trifluoromethoxy)benzonitrile, 3-(trifluoromethoxy)benzonitrile and 4-(trifluoromethoxy)benzonitrile.

Specific examples of the above fluorinated benzoic acid include pentafluorobenzoic acid, 2,3,4,5-tetrafluorobenzoic acid, 2,3,4,6-tetrafluorobenzoic acid, 2,3,5,6-tetrafluorobenzoic acid, 2,3,4-trifluorobenzoic acid, 2,3,5-trifluorobenzoic acid, 2,3,6-trifluorobenzoic acid, 2,4,5-trifluorobenzoic acid, 2,4,6-trifluorobenzoic acid, 3,4,5-trifluorobenzoic acid, 2,3-difluorobenzoic acid, 2,4-difluorobenzoic acid, 2,5-difluorobenzoic acid, 2,6-difluorobenzoic acid, 3,4-difluorobenzoic acid, 3,5-difluorobenzoic acid, 2-fluorobenzoic acid, 3-fluorobenzoic acid, 4-fluorobenzoic acid, 2,4-bis(trifluoromethyl)benzoic acid, 2,5-bis(trifluoromethyl)benzoic acid, 2,6-bis(trifluoromethyl)benzoic acid, 3,4-bis(trifluoromethyl)benzoic acid, 3,5-bis(trifluoromethyl)benzoic acid, 2-(trifluoromethyl)benzoic acid, 3-(trifluoromethyl)benzoic acid and 4-(trifluoromethyl)benzoic acid.

Specific examples of the above ester of the fluorinated benzoic acid include a pentafluorobenzoate such as methyl pentafluorobenzoate and ethyl pentafluorobenzoate, a 2,3,4,5-tetrafluorobenzoate such as methyl 2,3,4,5-tetrafluorobenzoate and ethyl 2,3,4,5-tetrafluorobenzoate, a 2,3,4,6-tetrafluorobenzoate such as methyl 2,3,4,6-tetrafluorobenzoate and ethyl 2,3,4,6-tetrafluorobenzoate, a 2,3,5,6-tetrafluorobenzoate such as methyl 2,3,5,6-tetrafluorobenzoate and ethyl 2,3,5,6-tetrafluorobenzoate, a 2,3,4-trifluorobenzoate such as methyl 2,3,4-trifluorobenzoate and ethyl 2,3,4-trifluorobenzoate, a 2,3,5-trifluorobenzoate such as methyl 2,3,5-trifluorobenzoate and ethyl 2,3,5-trifluorobenzoate, a 2,3,6-trifluorobenzoate such as methyl 2,3,6-trifluoro and ethyl 2,3,6-trifluorobenzoate, a 2,4,5-trifluorobenzoate such as methyl 2,4,5-trifluorobenzoate and ethyl 2,4,5-trifluorobenzoate, a 2,4,6-trifluorobenzoate such as methyl 2,4,6-trifluorobenzoate and ethyl 2,4,6-trifluorobenzoate, a 3,4,5-trifluorobenzoate such as methyl 3,4,5-trifluorobenzoate and ethyl 3,4,5-trifluorobenzoate, a 2,3-difluorobenzoate such as methyl 2,3-difluorobenzoate and ethyl 2,3-difluorobenzoate, a 2,4-difluorobenzoate such as methyl 2,4-difluorobenzoate and ethyl 2,4-difluorobenzoate, a 2,5-difluorobenzoate such as methyl 2,5-difluorobenzoate and ethyl 2,5-difluorobenzoate, a 2,6-difluorobenzoate such as methyl 2,6-difluorobenzoate and ethyl 2,6-difluorobenzoate, a 3,4-difluorobenzoate such as methyl 3,4-difluorobenzoate and ethyl 3,4-difluorobenzoate, a 3,5-difluorobenzoate such as methyl 3,5-difluorobenzoate and ethyl 3,5-difluorobenzoate, a 2,4-bis(trifluoromethyl)benzoate such as methyl 2,4-bis(trifluoromethyl)benzoate and ethyl 2,4-bis(trifluoromethyl)benzoate, a 2,5-bis(trifluoromethyl)benzoate such as methyl 2,5-bis(trifluoromethyl)benzoate and ethyl 2,5-bis(trifluoromethyl)benzoate, a 2,6-bis(trifluoromethyl)benzoate such as methyl 2,6-bis(trifluoromethyl)benzoate and ethyl 2,6-bis(trifluoromethyl)benzoate, a 3,4-bis(trifluoromethyl)benzoate such as methyl 3,4-bis(trifluoromethyl)benzoate and ethyl 3,4-bis(trifluoromethyl)benzoate, a 3,5-bis(trifluoromethyl)benzoate such as methyl 3,5-bis(trifluoromethyl)benzoate and ethyl 3,5-bis(trifluoromethyl)benzoate, a 2-(trifluoromethyl)benzoate such as methyl 2-(trifluoromethyl)benzoate and ethyl 2-(trifluoromethyl)benzoate, a 3-(trifluoromethyl)benzoate such as methyl 3-(trifluoromethyl)benzoate and ethyl 3-(trifluoromethyl)benzoate, and a 4-(trifluoromethyl)benzoate such as methyl 4-(trifluoromethyl)benzoate and ethyl 4-(trifluoromethyl)benzoate.

Specific examples of the above polycyclic aromatic compound include perfluorobiphenyl, perfluoronaphthalene, perfluorophenanthrene and 2,2',3,3',5,5',6,6'-octafluorobiphenyl.

Specific examples of the above fluorinated nitrobenzene include pentafluoronitrobenzene, 2,3,4,5-tetrafluoronitrobenzene, 2,3,4,6-tetrafluoronitrobenzene, 2,3,5,6-tetrafluoronitrobenzene, 2,3,4-trifluoronitrobenzene, 2,3,5-trifluoronitrobenzene, 2,3,6-trifluoronitrobenzene, 2,4,5-trifluoronitrobenzene, 2,4,6-trifluoronitrobenzene, 3,4,5-trifluoronitrobenzene, 2,3-difluoronitrobenzene, 2,4-difluoronitrobenzene, 2,5-difluoronitrobenzene, 2,6-difluoronitrobenzene, 3,4-difluoronitrobenzene, 3,5-difluoronitrobenzene, 2-fluoronitrobenzene, 3-fluoronitrobenzene, 4-fluoronitrobenzene, 2,3-bis(trifluoromethyl)nitrobenzene, 2,4-bis(trifluoromethyl)nitrobenzene, 2,5-bis(trifluoromethyl)nitrobenzene, 2,6-bis(trifluoromethyl)nitrobenzene, 3,4-bis(trifluoromethyl)nitrobenzene, 3,5-bis(trifluoromethyl)nitrobenzene, 2-(trifluoromethyl)nitrobenzene, 3-(trifluoromethyl)nitrobenzene, 4-(trifluoromethyl)nitrobenzene, 3-(trifluoromethoxy)nitrobenzene, 4-(trifluoromethoxy)nitrobenzene, (3-nitrophenyl)sulfur pentafluoride and (4-nitrophenyl)sulfur pentafluoride.

Specific examples of the above fluorinated phenyl alkyl alcohol include pentafluorobenzyl alcohol, 2,3,4,5-tetrafluorobenzyl alcohol, 2,3,4,6-tetrafluorobenzyl alcohol, 2,3,5,6-tetrafluorobenzyl alcohol, 2,3,4-trifluorobenzyl alcohol, 2,3,5-trifluorobenzyl alcohol, 2,3,6-trifluorobenzyl alcohol, 2,4,5-trifluorobenzyl alcohol, 2,4,6-trifluorobenzyl alcohol, 3,4,5-trifluorobenzyl alcohol, 2,3-difluorobenzyl alcohol, 2,4-difluorobenzyl alcohol, 2,5-difluorobenzyl alcohol, 2,6-difluorobenzyl alcohol, 3,4-difluorobenzyl alcohol, 3,5-difluorobenzyl alcohol, 2-fluorobenzyl alcohol, 3-fluorobenzyl alcohol, 4-fluorobenzyl alcohol, 1-(pentafluorophenyl)ethanol, 1-(2,3,4,5-tetrafluorophenyl)ethanol, 1-(2,3,4,6-tetrafluorophenyl)ethanol, 1-(2,3,5,6-tetrafluorophenyl)ethanol, 1-(2,3,4-trifluorophenyl)ethanol, 1-(2,3,5-trifluorophenyl)ethanol, 1-(2,3,6-trifluorophenyl)ethanol, 1-(2,4,5-trifluorophenyl)ethanol, 1-(2,4,6-trifluorophenyl)ethanol, 1-(3,4,5-trifluorophenyl)ethanol, 1-(2,3-difluorophenyl)ethanol, 1-(2,4-difluorophenyl)ethanol, 1-(2,5-difluorophenyl)ethanol, 1-(2,6-difluorophenyl)ethanol, 1-(3,4-difluorophenyl)ethanol, 1-(3,5-difluorophenyl)ethanol, 1-(2-fluorophenyl)ethanol, 1-(3-fluorophenyl)ethanol, 1-(4-fluorophenyl)ethanol, 2,4-bis(trifluoromethyl)benzyl alcohol, 2,5-bis(trifluoromethyl)benzyl alcohol, 2,6-bis(trifluoromethyl)benzyl alcohol, 3,4-bis(trifluoromethyl)benzyl alcohol, 3,5-bis(trifluoromethyl)benzyl alcohol, 2-(trifluoromethyl)benzyl alcohol, 3-(trifluoromethyl)benzyl alcohol, 4-(trifluoromethyl)benzyl alcohol, and 1-[3,5-bis(trifluoromethyl)phenyl]ethanol.

Specific examples of the above fluorinated phenol and its ester include pentafluorophenol, 2,3,5,6-tetrafluorophenol, 2,3,4-trifluorophenol, 2,3,5-trifluorophenol, 2,3,6-trifluorophenol, 3,4,5-trifluorophenol, 2,3-difluorophenol, 2,4-difluorophenol, 2,5-difluorophenol, 2,6-difluorophenol, 3,4-difluorophenol, 3,5-difluorophenol, 2,5-bis(trifluoromethyl)phenol, 3,5-bis(trifluoromethyl)phenol, 2-(trifluoromethyl)phenol, 3-(trifluoromethyl)phenol, 4-(trifluoromethyl)phenol, pentafluorophenyl formate, pentafluorophenyl acetate, pentafluorophenyl propionate, pentafluorophenyl butanoate, pentafluorophenyl pentanoate, 2,3,5,6-tetrafluorophenyl formate, 2,3,5,6-tetrafluorophenyl acetate, 2,3,5,6-tetrafluorophenyl propionate, 2,3,5,6-tetrafluorophenyl butanoate, 2,3,5,6-tetrafluorophenyl pentanoate, 2,3,4-trifluorophenyl formate, 2,3,4-trifluorophenyl acetate, 2,3,4-trifluorophenyl propionate, 2,3,4-trifluorophenyl butanoate, 2,3,4-trifluorophenyl pentanoate, 2,3,5-trifluorophenyl formate, 2,3,5-trifluorophenyl acetate, 2,3,5-trifluorophenyl propionate, 2,3,5-trifluorophenyl butanoate, 2,3,5-trifluorophenyl pentanoate, 2,3,6-trifluorophenyl formate, 2,3,6-trifluorophenyl acetate, 2,3,6-trifluorophenyl propionate, 2,3,6-trifluorophenyl butanoate, 2,3,6-trifluorophenyl pentanoate, 3,4,5-trifluorophenyl formate, 3,4,5-trifluorophenyl acetate, 3,4,5-trifluorophenyl propionate, 3,4,5-trifluorophenyl butanoate, 3,4,5-trifluorophenyl pentanoate, 2,3-difluorophenyl formate, 2,3-difluorophenyl acetate, 2,3-difluorophenyl propionate, 2,3-difluorophenyl butanoate, 2,3-difluorophenyl pentanoate, 2,4-difluorophenyl formate, 2,4-difluorophenyl acetate, 2,4-difluorophenyl propionate, 2,4-difluorophenyl butanoate, 2,4-difluorophenyl pentanoate, 2,5-difluorophenyl formate, 2,5-difluorophenyl acetate, 2,5-difluorophenyl propionate, 2,5-difluorophenyl butanoate, 2,5-difluorophenyl pentanoate, 2,6-difluorophenyl formate, 2,6-difluorophenyl acetate, 2,6-difluorophenyl propionate, 2,6-difluorophenyl butanoate, 2,6-difluorophenyl pentanoate, 3,4-difluorophenyl formate, 3,4-difluorophenyl acetate, 3,4-difluorophenyl propionate, 3,4-difluorophenyl butanoate, 3,4-difluorophenyl pentanoate, 3,5-difluorophenyl formate, 3,5-difluorophenyl acetate, 3,5-difluorophenyl propionate, 3,5-difluorophenyl butanoate, 3,5-difluorophenyl pentanoate, 2,5-bis(trifluoromethyl)phenyl formate, 2,5-bis(trifluoromethyl)phenyl acetate, 2,5-bis(trifluoromethyl)phenyl propionate, 2,5-bis(trifluoromethyl)phenyl butanoate, 2,5-bis(trifluoromethyl)phenyl pentanoate, 3,5-bis(trifluoromethyl)phenyl formate, 3,5-bis(trifluoromethyl)phenyl acetate, 3,5-bis(trifluoromethyl)phenyl propionate, 3,5-bis(trifluoromethyl)phenyl butanoate, 3,5-bis(trifluoromethyl)phenyl pentanoate, 2-(trifluoromethyl)phenyl formate, 2-(trifluoromethyl)phenyl acetate, 2-(trifluoromethyl)phenyl propionate, 2-(trifluoromethyl)phenyl butanoate, 2-(trifluoromethyl)phenyl pentanoate, 3-(trifluoromethyl)phenyl formate, 3-(trifluoromethyl)phenyl acetate, 3-(trifluoromethyl)phenyl propionate, 3-(trifluoromethyl)phenyl butanoate, 3-(trifluoromethyl)phenyl pentanoate, 4-(trifluoromethyl)phenyl formate, 4-(trifluoromethyl)phenyl acetate, 4-(trifluoromethyl)phenyl propionate, 4-(trifluoromethyl)phenyl butanoate, and 4-(trifluoromethyl)phenyl pentanoate.

Specific examples of the above fluorinated aromatic ketone include 2',3',4',5',6'-pentafluoroacetophenone, 2',3',4',5'-tetrafluoroacetophenone, 2',3',4'-trifluoroacetophenone, 2',3',5'-trifluoroacetophenone, 2',3',6'-trifluoroacetophenone, 2',4',5'-trifluoroacetophenone, 2',4',6'-trifluoroacetophenone, 3',4',5'-trifluoroacetophenone, 2',3'-difluoroacetophenone, 2',4'-difluoroacetophenone, 2',5'-difluoroacetophenone, 2',6'-difluoroacetophenone, 3',4'-difluoroacetophenone, 3',5'-difluoroacetophenone, 2'-fluoroacetophenone, 3'-fluoroacetophenone, 4'-fluoroacetophenone, 2',3'-bis(trifluoromethyl)acetophenone, 2',4'-bis(trifluoromethyl)acetophenone, 2',5'-bis(trifluoromethyl)acetophenone, 2',6'-bis(trifluoromethyl)acetophenone, 3',4'-bis(trifluoromethyl)acetophenone, 3',5'-bis(trifluoromethyl)acetophenone, 2'-(trifluoromethyl)acetophenone, 3'-(trifluoromethyl)acetophenone, 4'-(trifluoromethyl)acetophenone, perfluorobenzophenone, 2,3,4,5,6-pentafluorobenzophenone, and 2,2,2-trifluoroacetophenone.

Specific examples of the above fluorinated aromatic ether include pentafluoroanisole, 2,3,5,6-tetrafluoroanisole, 2,3,4-trifluoroanisole, 2,3,6-trifluoroanisole, 2,4,5-trifluoroanisole, 2,4,6-trifluoroanisole, 3,4,5-trifluoroanisole, 2,3-difluoroanisole, 2,4-difluoroanisole, 2,5-difluoroanisole, 2,6-difluoroanisole, 3,4-difluoroanisole, 3,5-difluoroanisole, 2-fluoroanisole, 3-fluoroanisole, 4-fluoroanisole, 3,5-bis(trifluoromethyl)anisole, 2-(trifluoromethyl)anisole, 3-(trifluoromethyl)anisole, 4-(trifluoromethyl)anisole, decafluorodiphenyl ether, 4-bromo-2,2',3,3',4',5,5',6,6'-nonafluorodiphenyl ether, and 2,3,5,6-tetrafluoro-1,4-bis(pentafluorophenoxy)benzene.

Specific examples of the above fluorinated aromatic sulfonyl compound include pentafluorophenylsulfonyl chloride.

Specific examples of the above fluorinated pyridine compound include pentafluoropyridine, 4-cyano-2,3,5,6-tetrafluoropyridine, 3-cyano-2,5,6-trifluoropyridine, and 3,5-dichloro-2,4,6-trifluoropyridine.

Specific examples of the above fluorinated aromatic carbonate include bis(pentafluorophenyl) carbonate, and methyl pentafluorophenyl carbonate.

The above perfluoroalkyl-substituted benzene means a compound having the benzene ring directly substituted by a perfluoroalkyl group and having no substituent other than the perfluoroalkyl group and halogen atoms. Specific examples of such a perfluoroalkyl-substituted benzene include benzotrifluoride, 2-chlorobenzotrifluoride, 3-chlorobenzotrifluoride, 4-chlorobenzotrifluoride, 1,3-bis(trifluoromethyl)benzene, 1,3,5-tris(trifluoromethyl)benzene, perfluorotoluene, and perfluoromesitylene. Further, perfluorobenzene is hexafluorobenzene having all 6 hydrogen atoms of benzene substituted by fluorine atoms.

Specific examples of the above polyfluoroalkyl ester of benzoic acid include 2,2-difluoroethyl benzoate, 2,2,2-trifluoroethyl benzoate, 1,1,1,3,3,3-hexafluoroisopropyl benzoate, 2,2,3,3-tetrafluoropropyl benzoate, 2,2,3,3,3-pentafluoropropyl benzoate, 2,2,3,3,4,4,4-heptafluorobutyl benzoate, 2,2,3,3,4,4,5,5-octafluoropentyl benzoate, 2,2,3,3,4,4,5,5,5-nonafluoropentyl benzoate, 2,2,3,3,4,4,5,5,6,6,6-undecafluorohexyl benzoate, 2,2,3,3,4,4,5,5,6,6,7,7,7-tridecafluoroheptyl benzoate, 2,2,3,3,4,4,5,5,6,6,7,7-dodecafluoroheptyl benzoate, 1H,1H-nonafluoro-3,6-dioxaheptyl benzoate, 2,2,3,3-tetrafluoropropyl benzoate, 1H,1H-tridecafluoro-3,6,9-trioxadecyl benzoate, 3,3,3-trifluoropropyl benzoate, 3,3,4,4,4-pentafluorobutyl benzoate, 3,3,4,4,5,5,5-heptafluoropentyl benzoate, 3,3,4,4,5,5,6,6,6-nonafluorohexyl benzoate, 3,3,4,4,5,5,6,6,7,7,8,8,8-tridecafluorooctyl benzoate, and 3,3,4,4,5,5,6,6,7,7,8,8,9,9,10,10,10-heptadecafluorodecyl benzoate.

Specific examples of the above polyfluoroalkyl ester of phthalic acid include bis(2,2,2-trifluoroethyl)phthalate, bis(2,2,2-trifluoroethyl)isophthalate, bis(2,2,2-trifluoroethyl)terephthalate, bis(2,2,3,3,4,4,5,5,5-nonafluoropentyl)phthalate, bis(2,2,3,3,4,4,5,5,5-nonafluoropentyl)isophthalate, bis(2,2,3,3,4,4,5,5,5-nonafluoropentyl)terephthalate, bis(3,3,4,4,5,5,6,6,7,7,8,8,8-tridecafluorooctyl)phthalate, bis(3,3,4,4,5,5,6,6,7,7,8,8,8-tridecafluorooctyl)isophthalate, and bis(3,3,4,4,5,5,6,6,7,7,8,8,8-tridecafluorooctyl)terephthalate.

The above aryl ester of trifluoromethanesulfonic acid may be phenyl trifluoromethanesulfonate, 4-methoxyphenyl trifluoromethanesulfonate, and 4-acetylphenyl trifluoromethanesulfonate.

Among such fluorinated aromatic compounds, as the fluorinated aromatic compound in the composition of the present invention, the following compounds are more preferred.

Pentafluorobenzonitrile, 2,3,4,5-tetrafluorobenzonitrile, 2,3,4,6-tetrafluorobenzonitrile, 2,3,5,6-tetrafluorobenzonitrile, 2,3,4-trifluorobenzonitrile, 2,3,5-trifluorobenzonitrile, 2,3,6-trifluorobenzonitrile, 2,4,5-trifluorobenzonitrile, 2,4,6-trifluorobenzonitrile, 3,4,5-trifluorobenzonitrile, 2,3-difluorobenzonitrile, 2,4-difluorobenzonitrile, 2,5-difluorobenzonitrile, 2,6-difluorobenzonitrile, 3,4-difluorobenzonitrile, 3,5-difluorobenzonitrile, 4-fluorobenzonitrile, 2,4-bis(trifluoromethyl)benzonitrile, 2,5-bis(trifluoromethyl)benzonitrile, 2,6-bis(trifluoromethyl)benzonitrile, 3,5-bis(trifluoromethyl)benzonitrile, 2-(trifluoromethyl)benzonitrile, 3-(trifluoromethyl)benzonitrile, 4-(trifluoromethyl)benzonitrile, (3-cyanophenyl)sulfur pentafluoride, (4-cyanophenyl)sulfur pentafluoride, 2-(trifluoromethoxy)benzonitrile, 3-(trifluoromethoxy)benzonitrile, 4-(trifluoromethoxy)benzonitrile, pentafluorobenzoic acid, methyl pentafluorobenzoate, ethyl pentafluorobenzoate, methyl 2,3,4,5-tetrafluorobenzoate, ethyl 2,3,4,5-tetrafluorobenzoate, methyl 2,3,5,6-tetrafluorobenzoate, ethyl 2,3,5,6-tetrafluorobenzoate; methyl 2,4,5-trifluorobenzoate, ethyl 2,4,5-trifluorobenzoate, methyl 2,4,6-trifluorobenzoate, ethyl 2,4,6-trifluorobenzoate, methyl 2,4-difluorobenzoate, ethyl 2,4-difluorobenzoate, methyl 2,6-difluorobenzoate, ethyl 2,6-difluorobenzoate, methyl 2,4-bis(trifluoromethyl)benzoate, ethyl 2,4-bis(trifluoromethyl)benzoate, methyl 2,5-bis(trifluoromethyl)benzoate, ethyl 2,5-bis(trifluoromethyl)benzoate, methyl 2,6-bis(trifluoromethyl)benzoate, ethyl 2,6-bis(trifluoromethyl)benzoate, methyl 3,5-bis(trifluoromethyl)benzoate, ethyl 3,5-bis(trifluoromethyl)benzoate, methyl 2-(trifluoromethyl)benzoate, ethyl 2-(trifluoromethyl)benzoate, methyl 3-(trifluoromethyl)benzoate, ethyl 3-(trifluoromethyl)benzoate, methyl 4-(trifluoromethyl)benzoate, ethyl 4-(trifluoromethyl)benzoate, perfluorobiphenyl, perfluoronaphthalene, pentafluoronitrobenzene, 2,3,4,5-tetrafluoronitrobenzene, 2,3,4,6-tetrafluoronitrobenzene, 2,3,5,6-tetrafluoronitrobenzene, 2,3,4-trifluoronitrobenzene, 2,3,5-trifluoronitrobenzene, 2,3,6-trifluoronitrobenzene, 2,4,5-trifluoronitrobenzene, 2,4,6-trifluoronitrobenzene, 3,4,5-trifluoronitrobenzene, 2,3-difluoronitrobenzene, 2,4-difluoronitrobenzene, 2,5-difluoronitrobenzene, 2,6-difluoronitrobenzene, 3,4-difluoronitrobenzene, 3,5-difluoronitrobenzene, 2,3-bis(trifluoromethyl)nitrobenzene, 2,4-bis(trifluoromethyl)nitrobenzene, 2,5-bis(trifluoromethyl)nitrobenzene, 2,6-bis(trifluoromethyl)nitrobenzene, 3,4-bis(trifluoromethyl)nitrobenzene, 3,5-bis(trifluoromethyl)nitrobenzene, 2-(trifluoromethyl)nitrobenzene, 3-(trifluoromethyl)nitrobenzene, 4-(trifluoromethyl)nitrobenzene, (3-nitrophenyl)sulfur pentafluoride, (4-nitrophenyl)sulfur pentafluoride, 3-(trifluoromethoxy)nitrobenzene, 4-(trifluoromethoxy)nitrobenzene, pentafluorobenzyl alcohol, 2,3,4,5-tetrafluorobenzyl alcohol, 2,3,4,6-tetrafluorobenzyl alcohol, 2,3,5,6-tetrafluorobenzyl alcohol, 2,3,4-trifluorobenzyl alcohol, 2,3,5-trifluorobenzyl alcohol, 2,3,6-trifluorobenzyl alcohol, 2,4,5-trifluorobenzyl alcohol, 2,4,6-trifluorobenzyl alcohol, 3,4,5-trifluorobenzyl alcohol, 1-(pentafluorophenyl)ethanol, 1-(2,3,4,5-tetrafluorophenyl)ethanol, 1-(2,3,4,6-tetrafluorophenyl)ethanol, 1-(2,3,5,6-tetrafluorophenyl)ethanol, 1-(2,3,4-trifluorophenyl)ethanol, 1-(2,3,5-trifluorophenyl)ethanol, 1-(2,3,6-trifluorophenyl)ethanol, 1-(2,4,5-trifluorophenyl)ethanol, 1-(2,4,6-trifluorophenyl)ethanol, 1-(3,4,5-trifluorophenyl)ethanol, 2,4-bis(trifluoromethyl)benzyl alcohol, 2,5-bis(trifluoromethyl)benzyl alcohol, 2,6-bis(trifluoromethyl)benzyl alcohol, 3,4-bis(trifluoromethyl)benzyl alcohol, 3,5-bis(trifluoromethyl)benzyl alcohol, 2-(trifluoromethyl)benzyl alcohol, 3-(trifluoromethyl)benzyl alcohol, 4-(trifluoromethyl)benzyl alcohol, 1-[3,5-bis(trifluoromethyl)phenyl]ethanol, pentafluorophenyl formate, pentafluorophenyl acetate, pentafluorophenyl propionate, pentafluorophenyl butanoate, pentafluorophenyl pentanoate, 2',3',4',5',6'-pentafluoroacetophenone, 2',3',4',5'-tetrafluoroacetophenone, 2',3',4'-trifluoroacetophenone, 2',3',5'-trifluoroacetophenone, 2',3',6'-trifluoroacetophenone, 2',4',5'-trifluoroacetophenone, 2',4',6'-trifluoroacetophenone, 3',4',5'-trifluoroacetophenone, 2',3'-difluoroacetophenone, 2',4'-difluoroacetophenone, 2',5'-difluoroacetophenone, 2',6'-difluoroacetophenone, 3',4'-difluoroacetophenone, 3',5'-difluoroacetophenone, 2',4'-bis(trifluoromethyl)acetophenone, 2',5'-bis(trifluoromethyl)acetophenone, 3',5'-bis(trifluoromethyl)acetophenone, 3'-(trifluoromethyl)acetophenone, perfluorobenzophenone, 2,3,4,5,6-pentafluorobenzophenone, 2,2,2-trifluoroacetophenone, pentafluoroanisole, 3,5-bis(trifluoromethyl)anisole, 2-(trifluoromethyl)anisole, 3-(trifluoromethyl)anisole, 4-(trifluoromethyl)anisole, decafluorodiphenyl ether, 4-bromo-2,2',3,3',4',5,5',6,6'-nonafluorodiphenyl ether, pentafluorophenylsulfonyl chloride, pentafluoropyridine, 4-cyano-2,3,5,6-tetrafluoropyridine, 3-cyano-2,5,6-trifluoropyridine, bis(pentafluorophenyl)carbonate, methylpentafluorophenylcarbonate, benzotrifluoride, 2-benzotrifluoride, 3-chlorobenzotrifluoride, 4-chlorobenzotrifluoride, 1,3-bis(trifluoromethyl)benzene, hexafluorobenzene, 2,2,2-trifluoroethyl benzoate, 1,1,1,3,3,3-hexafluoroisopropyl benzoate, 2,2,3,3-tetrafluoropropyl benzoate, 2,2,3,3,3-pentafluoropropyl benzoate, 2,2,3,3,4,4,4-heptafluorobutyl benzoate, 2,2,3,3,4,4,5,5-octafluoropentyl benzoate, 2,2,3,3,4,4,5,5,5-nonafluoropentyl benzoate, 2,2,3,3,4,4,5,5,6,6,6-undecafluorohexyl benzoate, 2,2,3,3,4,4,5,5,6,6,7,7,7-tridecafluoroheptyl benzoate, 2,2,3,3,4,4,5,5,6,6,7,7-dodecafluoroheptyl benzoate, 1H,1H-nonafluoro-3,6-dioxaheptyl benzoate, 2,2,3,3-tetrafluoropropyl benzoate, 1H,1H-tridecafluoro-3,6,9-trioxadecyl benzoate, 3,3,3-trifluoropropyl benzoate, 3,3,4,4,4-pentafluorobutyl benzoate, 3,3,4,4,5,5,5-heptafluoropentyl benzoate, 3,3,4,4,5,5,6,6,6-nonafluorohexyl benzoate, 3,3,4,4,5,5,6,6,7,7,8,8,8-tridecafluorooctyl benzoate, 3,3,4,4,5,5,6,6,7,7,8,8,9,9,10,10,10-heptadecafluorodecyl benzoate, bis(2,2,2-trifluoroethyl)phthalate, bis(3,3,4,4,5,5,6,6,7,7,8,8,8-tridecafluorooctyl)phthalate, and 4-acetylphenyl trifluoromethanesulfonate.

Still further, as the fluorinated aromatic compound in the composition of the present invention, the following compounds are more preferred.

Pentafluorobenzonitrile, 2,3,4,5-tetrafluorobenzonitrile, 2,3,5,6-tetrafluorobenzonitrile, 2,4,5-trifluorobenzonitrile, 2,4,6-trifluorobenzonitrile, 3,4,5-trifluorobenzonitrile, 2,3-difluorobenzonitrile, 2,4-difluorobenzonitrile, 2,5-difluorobenzonitrile, 2,6-difluorobenzonitrile, 3,4-difluorobenzonitrile, 3,5-difluorobenzonitrile, 4-fluorobenzonitrile, 3,5-bis(trifluoromethyl)benzonitrile, 2-(trifluoromethyl)benzonitrile, 3-(trifluoromethyl)benzonitrile, 4-(trifluoromethyl)benzonitrile, 2-(trifluoromethoxy)benzonitrile, 3-(trifluoromethoxy)benzonitrile, 4-(trifluoromethoxy)benzonitrile, (3-cyanophenyl)sulfur pentafluoride, (4-cyanophenyl)sulfur pentafluoride, pentafluorobenzoic acid, ethyl pentafluorobenzoate, methyl 2,4-difluorobenzoate, methyl 3-(trifluoromethyl)benzoate, methyl 4-(trifluoromethyl)benzoate, methyl 3,5-bis(trifluoromethyl)benzoate, perfluorobiphenyl, perfluoronaphthalene, pentafluoronitrobenzene, 2,4-difluoronitrobenzene, (3-nitrophenyl)sulfur pentafluoride, pentafluorobenzyl alcohol, 1-(pentafluorophenyl)ethanol, pentafluorophenyl acetate, pentafluorophenyl propionate, pentafluorophenyl butanoate, pentafluorophenyl pentanoate, perfluorobenzophenone, 2,3,4,5,6-pentafluorobenzophenone, 2',3',4',5',6'-pentafluoroacetophenone, 3',5'-bis(trifluoromethyl)acetophenone, 3'-(trifluoromethyl)acetophenone, 2,2,2-trifluoroacetophenone, pentafluoroanisole, 3,5-bis(trifluoromethyl)anisole, decafluorodiphenyl ether, 4-bromo-2,2',3,3',4',5,5',6,6'-nonafluorodiphenyl ether, pentafluorophenylsulfonyl chloride, pentafluoropyridine, 3-cyano-2,5,6-trifluoropyridine, bis(pentafluorophenyl)carbonate, benzotrifluoride, 4-chlorobenzotrifluoride, 1,3-bis(trifluoromethyl)benzene, hexafluorobenzene, 2,2,2-trifluoroethyl benzoate, 2,2,3,3-tetrafluoropropyl benzoate, 2,2,3,3,3-pentafluoropropyl benzoate, 3,3,4,4,5,5,6,6,7,7,8,8,8-tridecafluorooctyl benzoate, bis(2,2,2-trifluoroethyl) phthalate, and 4-acetylphenyl trifluoromethanesulfonate.

The fluorocopolymer composition of the present invention contains the above-described fluorinated aromatic compound having a melting point of at most 230° C. and having a fluorine content in the compound of from 5 to 75 mass %. In the fluorocopolymer composition of the present invention, the fluorinated aromatic compound has a function as a solvent which dissolves the above-described fluorocopolymer. Here, the "dissolution" of the fluorocopolymer in the fluorinated aromatic compound means that a composition of the fluorocopolymer and the fluorinated aromatic compound is in a transparent and uniform state at a certain temperature as described above, and the temperature includes a temperature of at most the melting point of the fluorocopolymer to be dissolved. That is, the fluorocopolymer composition of the present invention has a temperature range within which the composition is in a solution state, at least at a temperature of at most the melting point of the above-described fluorocopolymer. Further, the fluorocopolymer composition of the present invention should maintain a solution state in a certain temperature range of at most the melting point of the fluorocopolymer, and is not necessarily in a solution state at room temperature.

For the composition of the present invention, as a solvent which dissolves the fluorocopolymer, a compound selected from the above fluorinated aromatic compounds alone may be used, or it is possible to use a mixed organic solvent of the above fluorinated aromatic compound in combination with another organic solvent, for example, at least one member selected from an organic solvent containing no fluorine atom, a fluorinated aliphatic compound, a fluorinated alicyclic compound and the like, within a range not to impair the function as a solvent which dissolves the fluorocopolymer. That is, the fluorocopolymer composition of the present invention may contain, in addition to the above fluorocopolymer and fluorinated aromatic compound as essential components, another organic solvent which does not dissolve the fluorocopolymer, as an optional component.

Such another organic solvent other than the fluorinated aromatic compound optionally incorporated in the composition of the present invention is not particularly limited, but is preferably an organic solvent miscible with the fluorinated aromatic compound to be mixed at least at the dissolution temperature of the fluorocopolymer. As such another organic solvent other than the fluorinated aromatic compound which can be incorporated in the composition of the present invention, may, for example, be specifically an aromatic compound containing no fluorine atom, such as benzonitrile, acetophenone, nitrobenzene or methyl benzoate. Further, in a case where the composition of the present invention contains the fluorinated aromatic compound and another organic solvent in combination, the mixing ratio (by mass) of both solvents depends on the type of both solvents used, and the ratio of the fluorinated aromatic compound/another organic solvent other than the fluorinated aromatic compound is preferably from 9/1 to 1/9, more preferably from 5/5 to 3/7.

In the fluorocopolymer composition of the present invention, the content of the fluorinated aromatic compound or the mixed organic solvent containing it, that is, the mixed organic solvent of the fluorinated aromatic compound and another organic solvent (hereinafter the fluorinated aromatic compound or the mixed organic solvent containing the fluorinated aromatic compound will be referred to as "a solvent such as the fluorinated aromatic compound" as the case requires) is not particularly limited, but is preferably from 20 to 99.9 mass % to the total amount of the composition, from the viewpoint of forming properties when the composition is used to obtain a formed product. For example, in a case where the fluorocopolymer composition of the present invention is used to obtain a fluorocopolymer thin film, the content of the solvent such as the fluorinated aromatic compound in the composition is preferably from 70 to 99.9 mass %, more preferably from 90 to 99.5 mass %, most preferably from 95 to 99 mass % to the total amount of the composition. When the content is within such a range, handling efficiency e.g. at the time of coating in preparation of a thin film will be excellent, and a homogenous thin film made of the fluorocopolymer can be obtained. Further, in a case where the fluorocopolymer composition of the present invention is used to obtain a fluorocopolymer porous material for which no support material is used at the time of forming, such as a tube made of the fluorocopolymer, the content of the solvent such as the fluorinated aromatic compound in the composition is preferably from 20 to 95 mass %, more preferably from 40 to 90 mass % to the total amount of the composition. When the content is within such a range, forming properties into a film and a hollow fiber will be excellent, and a high strength fluorocopolymer porous material having a narrow pore size distribution will be obtained.

The fluorocopolymer composition of the present invention contains the above-described fluorocopolymer and fluorinated aromatic compound as essential components and contains the above-described organic solvent other than the fluorinated aromatic compound as an optional component, and further, as the case requires, may contain another optional component within a range not to impair the effect of the present invention. Such an optional component may, for example, be additives such as an antioxidant, an ultraviolet stabilizer, a crosslinking agent, a lubricant, a plasticizer, a thickener, a filler, a reinforcing agent, a pigment, a dye, a flame retardant or an antistatic agent. Further, the content of such an optional component which will not impair the effect of the present invention may be a content of at most 30 mass % to the total amount of the composition.

Now, the production process of the present invention to produce the fluorocopolymer composition of the present invention using the above various components which the fluorocopolymer composition of the present invention contains will be described below.

The production process of the present invention is a process for producing the fluorocopolymer composition, which comprises a step of dissolving the fluorocopolymer having repeating units based on ethylene and repeating units based on tetrafluoroethylene, in the fluorinated aromatic compound or the mixed organic solvent containing the fluorinated aromatic compound, at a temperature of at most the melting point of the fluorocopolymer. The temperature at which the fluorocopolymer is dissolved in the solvent such as the fluorinated aromatic compound is more preferably a temperature lower than the melting point of the fluorocopolymer to be used by at least 30° C.

The above temperature for dissolution is specifically properly selected depending on the melting point of the fluorocopolymer to be used for the composition of the present invention, and is preferably a temperature lower than the melting point of the fluorocopolymer by at least 30° C. The melting point of the fluorocopolymer to be used in the present invention is about 275° C. at the highest, and accordingly the dissolution temperature is preferably at most 245° C., which is lower than 275° C. by at least 30° C. The temperature at which the fluorocopolymer is dissolved in the solvent such as the fluorinated aromatic compound, is more preferably at most 230° C., most preferably at most 200° C. In a case where the melting point of the fluorocopolymer used in the present invention is further lower, the above dissolution temperature may properly be adjusted depending on the melting point. Further, the lower limit of the temperature for dissolution is preferably 0° C., more preferably 20° C. If the temperature for dissolution is less than 0° C., no sufficient dissolution state will be obtained in some cases, and at a temperature exceeding 245° C., dissolution may sometimes be not readily conducted in practical operation.

In the dissolution step in the process for producing the composition of the present invention, conditions other than the temperature are no particularly limited, and the step is preferably carried out usually under normal pressure. E.g. in a case where the boiling point is lower than the dissolution temperature depending on the type of the fluorocopolymer or the solvent such as the fluorinated aromatic compound, dissolution may be carried out under autogenous pressure in a pressure resistant vessel, for example, under from about 0.01 to 1 MPa.

The dissolution time is influenced by the content of the fluorocopolymer and the form of the fluorocopolymer in the composition of the present invention. The form of the fluorocopolymer to be used is preferably a powder in view of the operation efficiency to shorten the dissolution time, however, one in the form of pellets or in another form may also be used in view of availability, etc.

The dissolution means in the dissolution step is not a special means but may be a common method. For example, required amounts of the respective components to be incorporated in the composition are weighed, and these components are uniformly mixed so that the fluorocopolymer is dissolved in the solvent such as the fluorinated aromatic compound at a temperature of at most the melting point of the fluorocopolymer used, preferably at a temperature of from 0 to 230° C., and the above dissolution is preferably conducted in view of efficiency by using a common stirring and mixing machine such as a homomixer, a Henschel mixer, a Banbury mixer, a pressure kneader, or a single screw or twin screw extruder. In a case where dissolution is carried out under pressure, an apparatus such as an autoclave equipped with a stirrer is used, and as the shape of the stirring blade, a marine propeller blade, a paddle blade, an anchor blade, a turbine blade or the like may be used.

The fluorocopolymer composition of the present invention thus obtained is applicable to formation of a thin film of a fluorocopolymer e.g. by applying the fluorocopolymer composition to a substrate or by dipping a substrate in the fluorocopolymer composition to form a coating film of the fluorocopolymer composition and further by removing the solvent from the coating film.

The process of forming a thin film of the fluorocopolymer by using the fluorocopolymer composition of the present invention may, for example, be a process of applying the fluorocopolymer composition to a substrate at a temperature of at least the dissolution temperature of the fluorocopolymer in the composition, followed by drying (removal of the solvent) at a temperature of at least said temperature, a process of applying the fluorocopolymer composition to a substrate at a temperature of at most the dissolution temperature of the fluorocopolymer in the composition, and heating the composition to a temperature of at least the dissolution temperature of the fluorocopolymer, followed by drying (removal of the solvent) at a temperature of at least said temperature, or a process of once dissolving the fluorocopolymer in the fluorocopolymer composition, and applying the composition to a substrate at a temperature of at most the dissolution temperature, followed by drying (removal of the solvent) at a temperature of at most the dissolution temperature of the fluorocopolymer. The drying method is not particularly limited, and an optional means may be employed. Drying by heating may be carried out, for example, by a method of using e.g. an inert oven or a circulating oven.

The method of applying the fluorocopolymer composition is not a special method, and a commonly employed method may be employed. Such an application method may, for example, be gravure coating, dip coating, die coating, electrostatic coating, brush coating, screen printing, roll coating or spin coating.

One embodiment of the process for forming a thin film of the fluorocopolymer composition using the fluorocopolymer composition of the present invention is a process including a step of applying the fluorocopolymer composition to a substrate at a temperature of at least the dissolution temperature of the fluorocopolymer in the composition, and is a process including a step of applying the fluorocopolymer composition characterized in that the fluorocopolymer is dissolved, and then it is applied to a substrate while it is in a dissolved state. By applying the fluorocopolymer composition in a state of a solution in which the fluorocopolymer is dissolved to a substrate by means of such an application step, and then removing the solvent e.g. by drying by heating, a dense and flat thin film of the fluorocopolymer can be obtained on the substrate. In the step of applying the fluorocopolymer composition, the preferred temperature of the composition varies depending on the fluorocopolymer composition, and is preferably from 50 to 250° C., more preferably from 80 to 200° C. If the temperature is lower than 50° C., the fluorocopolymer will not sufficiently be dissolved, and if the temperature exceeds 250° C., the solvent contained is likely to volatilize, such being unfavorable.

After the application in such a step, the heating temperature to obtain a dried thin film is preferably from 50 to 350° C., more preferably from 80 to 250° C. By heating within a such a temperature range, the fluorocopolymer is dissolved and homogenized in the fluorocopolymer composition coating film, and by removing the solvent e.g. by drying by heating, a dense and flat thin film of the fluorocopolymer can be obtained on the substrate.

Another embodiment of the process for forming a thin film of the fluorocopolymer using the fluorocopolymer composition of the present invention may be a process including a step of applying the fluorocopolymer composition to a substrate at a temperature of at most the dissolution temperature of the fluorocopolymer in the composition and then heating the composition to a temperature of at least the dissolution temperature of the fluorocopolymer. In this process, after the heating step, e.g. drying by heating is further carried out to remove the solvent, whereby a thin film of the fluorocopolymer can be formed on the substrate. In this process, restrictions on an apparatus are loose, and the process is excellent in the operation efficiency, since the temperature of the composition in the step of applying the fluorocopolymer composition to the substrate may be low.

The fluorocopolymer composition used for such a process may be a composition in a state where a powdery fluorocopolymer is dispersed in the solvent such as the fluorinated aromatic compound, or may be a composition in a state where the fluorocopolymer is once dissolved in the solvent such as the fluorinated aromatic compound and then cooled to have good dispersibility, and it is preferred to employ a composition in a state where the fluorocopolymer is once dissolved and then cooled. The temperature of the fluorocopolymer composition when the composition is applied to the substrate is not particularly limited, and is preferably from 0 to 150° C., more preferably from 5 to 80° C., from the viewpoint of operation efficiency. The heating temperature after application is preferably from 50 to 350° C., more preferably from 80 to 250° C. By heating within such a temperature range, the fluorocopolymer is dissolved and homogenized in the fluorocopolymer composition coating film, and by removing the solvent e.g. drying by heating, a dense and flat thin film of the fluorocopolymer can be obtained on the substrate.

Further, still another embodiment of the process for forming a thin film of the fluorocopolymer by using the fluorocopolymer composition of the present invention may be a process of once dissolving the fluorocopolymer in the solvent such as the fluorinated aromatic compound in the fluorocopolymer composition, applying the composition to a substrate at a temperature of at most the dissolution temperature, and further drying the composition coating film on the substrate at a temperature of at most the dissolution temperature of the fluorocopolymer to remove the solvent.

By this process, which includes no step of applying a load of high temperature on the substrate, formation of a thin film of a fluorocopolymer on a material having low heat resistance, such as a plastic, paper or cloth, which has been difficult, can readily be conducted. The temperature of the fluorocopolymer composition when the composition is applied to the substrate is, when the above-described material having low heat resistance is used as the substrate, preferably set within a temperature range not exceeding the decomposition or deformation temperature of the substrate, and is preferably a temperature of from 0 to 150° C., more preferably a temperature of from 5 to 120° C., although it varies depending on the substrate. The drying temperature after application is preferably from 0 to 150° C., more preferably from 5 to 120° C. By carrying out application and drying within such a temperature range, it is possible to obtain a thin film of a fluorocopolymer having a uniform thickness on the substrate without decomposition nor deformation of the substrate, even when the substrate is made of a material having low heat resistance.

As described above, the fluorocopolymer composition of the present invention is a composition suitable for formation of a thin film of a fluorocopolymer on various substrates. The material and the form of the substrate on the surface of which a thin film of a fluorocopolymer can be formed by using the fluorocopolymer composition of the present invention, are not particularly limited, and specifically, substrates made of various materials such as a metal, glass, silicon, a plastic, a stone material, a wood material, a ceramic, cloth and paper may be mentioned. The thin film of the fluorocopolymer formed on the substrate may be used together with the substrate in the form of a substrate with a thin film or may be separated from the substrate and used by itself, depending on various applications.

In a case where the fluorocopolymer composition of the present invention is used to form a thin film of a fluorocopolymer on a substrate, which is used as it is in the form of a substrate with a thin film, a pretreatment may be applied to the substrate, for the purpose of improving the adhesion of the thin film to the substrate. For example, a silane coupling agent, polyethylenimine or the like may be applied to the substrate, the surface of the substrate may be physically treated e.g. by sandblasting, or treatment on the surface of the substrate e.g. by corona discharge may be carried out.

Further, the thin film of the fluorocopolymer formed on a substrate may be used, after separated from the substrate, as a formed product in the form of a film (hereinafter sometimes referred to simply as a "film"). In a case where it is separated from the substrate and used as a film, a substrate made of a material with good releasability may be used, or pretreatment may be applied to the substrate e.g. by a release agent. By producing a film of a fluorocopolymer by using the fluorocopolymer composition of the present invention in such a manner, it is possible to produce a film which is thin and uniform, as compared with a film obtainable by a common melt forming.

The thickness of the thin film of the fluorocopolymer formed on a substrate or the thickness of the formed product in the form of a film, can be freely selected depending on the purpose of use. When a high concentration solution or dispersion is used as the fluorocopolymer composition, a thin film having a thick film thickness will be obtained, and when a low concentration solution or dispersion is used, a thin film having a thin film thickness will be obtained. Otherwise, a thin film having a thicker film thickness can be obtained by repeatedly carrying out the application step. The thickness of the thin film thus obtained is preferably from 0.01 μm to 1,000.0 μm, more preferably from 0.1 μm to 100.0 μm, most preferably from 0.5 μm to 50.0 μm.

Further, it is possible that the fluorocopolymer in the fluorocopolymer composition of the present invention is designed to have a crosslinking property, the composition is applied to a substrate and the solvent is removed, and then the fluorocopolymer is crosslinked and cured to form a thin film comprising a cured product of the fluorocopolymer. As the crosslinking method, any conventional method may properly be employed. For example, a method may be mentioned wherein as the fluorocopolymer incorporated in the fluorocopolymer composition, one having, in addition to repeating units based on ethylene and repeating units based on tetrafluoroethylene, polymerized units based on a monomer having a crosslinking moiety, is used, and a crosslinking agent reactive with the above crosslinking moiety is added to the composition, a coating film is formed and the solvent is removed, and then crosslinking/curing reaction is conducted. Further, it is also possible that a fluorocopolymer having a crosslinking moiety capable of crosslinking e.g. by light or radioactive rays is used as the fluorocopolymer to prepare a fluorocopolymer composition, a coating film is formed and the solvent is removed, followed by irradiation with e.g. light or radioactive rays for crosslinking and curing thereby to form a thin film comprising a cured product of the fluorocopolymer.

Considering the above properties such as forming properties, the fluorocopolymer composition of the present invention is applicable as a protective coating agent or a water-repellent coating agent in an optical field such as an optical fiber cladding material, a lens, a mirror, a solar cell, an optical disk, a touch panel, a semiconductor device, a hybrid IC, a liquid crystal cell, a printed board, a photoconductor drum, a film condenser, a glass window or a film, or in an electrical field, a protective, weather-proof or stain proof coating agent in a medical field such as a syringe, a pipette, a thermometer, a beaker, a petri dish or a measuring cylinder, in a chemical field or for a solder mask, a solder resist, a rubber or a plastic, a protective coating agent for fibers and fabrics, an antifouling coating agent for a sealant, an IC sealing compound, an anticorrosive coating agent, a resin adhesion-inhibiting agent or an ink adhesion-inhibiting agent.

Further, the fluorocopolymer composition of the present invention may be advantageously used as a material composition for preparation of an interlayer insulating film or a protective film in a semiconductor device or an integrated circuit apparatus. By using the fluorocopolymer composition of the present invention to such an application, it is possible to obtain a semiconductor device integrated circuit apparatus having a high response speed with a small malfunction, making use of properties of a fluororesin such as low water absorption, low dielectric constant and high heat resistance.

EXAMPLES

Now, the present invention will be described in detail with reference to Examples. However, it should be understood that the present invention is by no means restricted to such specific Examples.
(Dissolution Procedure)

In the following Examples and Comparative Example, the following method was carried out unless otherwise specified.

In a test tube with a lid made of borosilicate glass having a thickness of 1 mm and an outer diameter of 16.5 mm, a solvent such as the fluorinated aromatic compound, a fluorocopolymer and a stirrer were put. The relative amounts of the fluorocopolymer and the solvent such as the fluorinated aromatic compound were adjusted so that the amount of the fluorocopolymer would be from 1 to 60 mass %. The test tube was heated in a well stirred oil bath, the temperature of which was controlled.

Heating was carried out with visual observation whether the fluorocopolymer was dissolved or not. The temperature at which the content in the test tube became a transparent and uniform solution and was confirmed to be completely dissolved, was recorded. Then, the test tube was once gradually cooled, the temperature at which the solution became turbid was confirmed, and the test tube was heated again, and the temperature at which a transparent and uniform solution was obtained again was regarded as the dissolution temperature.

Example 1

In a test tube with a lid made of borosilicate glass, 50 mg of ETFE (manufactured by Asahi Glass Company, Limited, Fluon (trademark) LM-720AP, melting point: 225° C., melt index: 18.7 (297° C.), hereinafter referred to as "ETFE1") as a fluorocopolymer, and 5 g of 2,6-difluorobenzonitrile were put and heated to 177° C. with stirring, whereupon the content in the test tube became a uniform and transparent solution. The test tube was gradually cooled, whereupon the solution became clouded at 168° C. The test tube was heated again, whereupon the solution became a uniform and transparent solution again at 173° C. ETFE1 was gradually added with stirring the solution while the temperature was maintained at 200° C., to increase the content of ETFE1, whereupon a uniform and transparent 2,6-difluorobenzonitrile solution (ETFE1 concentration: 60 mass %) containing 7.5 g of ETFE1 was obtained. The test tube was gradually cooled, whereupon the solution became clouded at 180° C. The test tube was heated again, whereupon the solution became a uniform and transparent solution again at 185° C. The dissolution temperature of ETFE1 at a concentration of 60 mass % was considered to be 185° C. The composition of ETFE1 and 2,6-difluorobenzonitrile obtained via a transparent solution state by the above operation is the fluorocopolymer composition of the present invention. The composition is clouded at room temperature, and is in a transparent and uniform solution state at 185° C. or higher.

Examples 2 to 58

The dissolution test was carried out and a fluorocopolymer composition was obtained in the same manner as in Example 1 except that the amount (the total amount of 50 mg of the initially charged amount and the amount gradually added) of ETFE1 used and the type of the solvent such as the fluorinated aromatic compound were changed as illustrated in Table 1 with respect to Examples 2 to 44 or in Table 2 with respect to Examples 45 to 58. The results of measurement of the dissolution temperature are shown in Tables 1 and 2.

A case where the amount of the fluorocopolymer charged shown in Table 1 or 2 is at most 0.05 g, means that the entire amount of the fluorocopolymer was initially charged. Further, in a case where the entire fluorocopolymer was initially charged, once the fluorocopolymer was dissolved, the solution was gradually cooled to make it clouded, and the solution was heated again to obtain a uniform solution, and the temperature at that time was regarded as the dissolution temperature and the dissolution test was completed.

Further, in a case where the solvent such as the fluorinated aromatic compound is a mixed organic solvent of at least two organic solvents, at least two solvents were sequentially put in the test tube in a mixing ratio shown in a bracket following the compound names, and the mixed organic solvent was used instead of 2,6-difluorobenzonitrile in Example 1.

Comparative Example 1

In a test tube with a lid made of borosilicate glass, 50 mg of ETFE1 as a fluorocopolymer and 5 g of diisobutyl adipate were put, and heated to 200° C. with stirring, but the content only expanded and no uniform solution was obtained.

Example 59

In a 20 ml pressure resistant glass reactor, 0.26 g of ETFE1 and 5 g of 1,3-bis(trifluoromethyl)benzene were put and heated to 150° C. with stirring under autogenous pressure, whereupon a uniform and transparent solution was obtained. The reactor was gradually cooled, whereupon the solution became clouded at 130° C. The reactor was heated again, whereupon the solution became a uniform and transparent solution again at 140° C. The dissolution temperature of ETFE1 at a concentration of 5 mass % was considered to be 140° C. The obtained fluorocopolymer composition is the composition of the present invention.

Examples 60 to 63

The dissolution test was carried out and a fluorocopolymer composition was obtained in the same manner as in Example 59 except that the amount of ETFE used and the type of the solvent such as the fluorinated aromatic compound were changed as illustrated in Table 2. The results of measurement of the dissolution temperature are shown in Table 2.

Example 64

The dissolution test was carried out and a fluorocopolymer composition was obtained in the same manner as in Example 1 except that the fluorocopolymer used was changed to 0.55 g (0.55 g as the total amount of the initially charged amount of 50 mg and the amount gradually added, the same applies hereinafter) of ETFE (manufactured by Asahi Glass Company, Limited, Fluon (trademark) Z-8820X, melting point: 260° C., melt index: 10 (297° C.), hereinafter referred to as "ETFE2"). The result of measurement of the dissolution temperature is shown in Table 2.

Examples 65 to 75

The dissolution test was carried out and a fluorocopolymer composition was obtained in the same manner as in Example 64 except that the amount of ETFE2 used and the type of the solvent such as the fluorinated aromatic compound were changed as illustrated in Table 2. The results of measurement of the dissolution temperature are shown in Table 2.

Example 76

The dissolution test was carried out and a fluorocopolymer composition was obtained in the same manner as in Example 59 except that the fluorocopolymer used was changed to 50 mg of ETFE2. The result of measurement of the dissolution temperature is shown in Table 2.

Example 77

The dissolution test was carried out and a fluorocopolymer composition was obtained in the same manner as in Example 1 except that the fluorocopolymer used was changed to 0.05 g of ETFE (manufactured by Asahi Glass Company, Limited, Fluon (trademark) AH-2000, melting point: 240° C., melt index: 25 (297° C.), hereinafter referred to as "ETFE3"). The result of measurement of the dissolution temperature is shown in Table 2.

Example 78

The dissolution test was carried out and a fluorocopolymer composition was obtained in the same manner as in Example 77 except that the solvent such as the fluorinated aromatic compound was changed to 3',5'-bis(trifluoromethyl)acetophenone. The result of measurement of the dissolution temperature is shown in Table 2.

Examples 79 to 81

The dissolution test was carried out and a fluorocopolymer composition was obtained in the same manner as in Example 59 except that the fluorocopolymer used was ETFE3, and its amount of use and the type of the solvent such as the fluorinated aromatic compound were changed as illustrated in Table 2. The results of measurement of the dissolution temperature are shown in Table 2.

Example 82

The dissolution test was carried out and a fluorocopolymer composition was obtained in the same manner as in Example 1 except that the fluorocopolymer used was changed to 0.05 g of ETFE (manufactured by Asahi Glass Company, Limited, Fluon (trademark) C-55AP, melting point: 265° C., melt index: 5 (297° C.), hereinafter referred to as "ETFE4", and the solvent such as the fluorinated aromatic compound was changed to perfluorobiphenyl. The result of measurement of the dissolution temperature is shown in Table 2.

Example 83

The dissolution test was carried out and a fluorocopolymer composition was obtained in the same manner as in Example 1 except that the fluorocopolymer used was changed to 0.55 g of ETFE (manufactured by DuPont, Tefzel (trademark) 750, melting point: 220 to 255° C., melt index: 7 (297° C.), hereinafter referred to as "ETFE5"). The result of measurement of the dissolution temperature is shown in Table 2.

Example 84

The dissolution test was carried out and a fluorocopolymer composition was obtained in the same manner as in Example 83 except that the solvent such as the fluorinated aromatic compound was changed to perfluorobiphenyl. The result of measurement of the dissolution temperature is shown in Table 2.

Example 85

The dissolution test was carried out and a fluorocopolymer composition was obtained in the same manner as in Example 1 except that the fluorocopolymer used was changed to 0.05 g of ETFE (manufactured by DAIKIN INDUSTRIES, LTD., NEOFLON (trademark) EP-610, melting point: 225° C., melt index: 30 (297° C.), hereinafter referred to as "ETFE6"). The result of measurement of the dissolution temperature is shown in Table 2.

Example 86

The dissolution test was carried out and a fluorocopolymer composition was obtained in the same manner as in Example 85 except that the amount of ETFE6 used was changed to 0.55 g, and the solvent such as the fluorinated aromatic compound was changed to perfluorobiphenyl. The result of measurement of the dissolution temperature is shown in Table 2.

Example 87

The dissolution test was carried out and a fluorocopolymer composition was obtained in the same manner as in Example 1 except that the fluorocopolymer used was changed to 0.05 g of ETFE (manufactured by Dyneon, Dyneon (trademark) HTE 1705, melting point: 210° C., hereinafter referred to as "ETFE7"). The result of measurement of the dissolution temperature is shown in Table 2.

Example 88

The dissolution test was carried out and a fluorocopolymer composition was obtained in the same manner as in Example 87 except that the solvent such as the fluorinated aromatic compound was changed to perfluorobiphenyl. The result of measurement of the dissolution temperature is shown in Table 2.

TABLE 1

| | Fluoro-copolymer | | Solvent such as the fluorinated aromatic compound | | | Polymer concentration | Dissolution temperature |
|---|---|---|---|---|---|---|---|
| | Type | (g) | Compound | Melting point (° C.) | (g) | (mass %) | (° C.) |
| Ex. 1 | ETFE1 | 7.50 | 2,6-Difluorobenzonitrile | 28 | 5 | 60 | 185 |
| Ex. 2 | ETFE1 | 1.31 | 2,4,6-Trifluorobenzonitrile | 60 | 5 | 21 | 167 |
| Ex. 3 | ETFE1 | 0.55 | Pentafluorobenzonitrile | 2 | 5 | 10 | 152 |
| Ex. 4 | ETFE1 | 0.55 | 2,3,5,6-Tetrafluorobenzonitrile | 29 | 5 | 10 | 166 |
| Ex. 5 | ETFE1 | 0.55 | 3,4,5-Trifluorobenzonitrile | 47 | 5 | 10 | 166 |
| Ex. 6 | ETFE1 | 0.55 | 2,3-Difluorobenzonitrile | Liquid at room temperature | 5 | 10 | 175 |
| Ex. 7 | ETFE1 | 0.55 | 2,4-Difluorobenzonitrile | 47 | 5 | 10 | 166 |
| Ex. 8 | ETFE1 | 0.55 | 2,5-Difluorobenzonitrile | 31 | 5 | 10 | 166 |
| Ex. 9 | ETFE1 | 0.55 | 3,4-Difluorobenzonitrile | 50 | 5 | 10 | 175 |
| Ex. 10 | ETFE1 | 0.05 | 2,3,4,5-Tetrafluorobenzonitrile | Liquid at room temperature | 5 | 1 | 135 |
| Ex. 11 | ETFE1 | 0.05 | 3,5-Difluorobenzonitrile | 89 | 5 | 1 | 155 |
| Ex. 12 | ETFE1 | 0.05 | 4-Fluorobenzonitrile | 34 | 5 | 1 | 185 |
| Ex. 13 | ETFE1 | 0.60 | 3,5-Bis(trifluoromethyl)benzonitrile | 21 | 5 | 11 | 159 |
| Ex. 14 | ETFE1 | 0.05 | 2-(Trifluoromethyl)benzonitrile | 19 | 5 | 1 | 173 |
| Ex. 15 | ETFE1 | 0.05 | 3-(Trifluoromethyl)benzonitrile | 17 | 5 | 1 | 151 |
| Ex. 16 | ETFE1 | 0.05 | 4-(Trifluoromethyl)benzonitrile | 36 | 5 | 1 | 168 |
| Ex. 17 | ETFE1 | 0.55 | 3-(Trifluoromethoxy)benzonitrile | Liquid at room temperature | 5 | 10 | 173 |
| Ex. 18 | ETFE1 | 0.05 | (3-Cyanophenyl)sulfur pentafluoride | Liquid at 60° C. | 5 | 1 | 168 |
| Ex. 19 | ETFE1 | 0.05 | (4-Cyanophenyl)sulfur pentafluoride | Liquid at 110° C. | 5 | 1 | 168 |
| Ex. 20 | ETFE1 | 0.55 | Ethyl pentafluorobenzoate | Liquid at room temperature | 5 | 10 | 164 |
| Ex. 21 | ETFE1 | 0.55 | Methyl 2,4-difluorobenzoate | Liquid at room temperature | 5 | 10 | 174 |
| Ex. 22 | ETFE1 | 0.55 | Methyl 3,5-bis(trifluoromethyl)benzoate | Liquid at room temperature | 5 | 10 | 186 |
| Ex. 23 | ETFE1 | 0.55 | Methyl 3-(trifluoromethyl)benzoate | Liquid at room temperature | 5 | 10 | 177 |
| Ex. 24 | ETFE1 | 0.55 | Methyl 4-(trifluoromethyl)benzoate | Liquid at room temperature | 5 | 10 | 168 |
| Ex. 25 | ETFE1 | 1.85 | Perfluorobiphenyl | 70 | 5 | 27 | 165 |
| Ex. 26 | ETFE1 | 1.85 | Perfluoronaphthalene | 87 | 5 | 27 | 165 |
| Ex. 27 | ETFE1 | 0.81 | 2,4-Difluoronitrobenzene | 9 | 5 | 14 | 187 |
| Ex. 28 | ETFE1 | 0.05 | (3-Nitrophenyl)sulfur pentafluoride | 0 | 5 | 1 | 147 |
| Ex. 29 | ETFE1 | 0.55 | 1-(Pentafluorophenyl)ethanol | 32 | 5 | 10 | 169 |
| Ex. 30 | ETFE1 | 0.05 | Pentafluorobenzyl alcohol | 37 | 5 | 1 | 182 |
| Ex. 31 | ETFE1 | 0.55 | Pentafluorophenyl pentanoate | Liquid at room temperature | 5 | 10 | 169 |
| Ex. 32 | ETFE1 | 0.55 | 2',3',4',5',6'-Pentafluoroacetophenone | Liquid at room temperature | 5 | 10 | 146 |
| Ex. 33 | ETFE1 | 0.55 | 3',5'-Bis(trifluoromethyl)acetophenone | Liquid at room temperature | 5 | 10 | 156 |
| Ex. 34 | ETFE1 | 0.05 | 3'-(Trifluoromethyl)acetophenone | Liquid at room temperature | 5 | 1 | 174 |
| Ex. 35 | ETFE1 | 0.05 | 2,3,4,5,6-Pentafluorobenzophenone | 37 | 5 | 1 | 187 |
| Ex. 36 | ETFE1 | 0.05 | Perfluorobenzophenone | 93 | 5 | 1 | 187 |
| Ex. 37 | ETFE1 | 0.55 | 3,5-Bis(trifluoromethyl)anisole | Liquid at room temperature | 5 | 10 | 141 |
| Ex. 38 | ETFE1 | 0.55 | 4-Bromo-2,2',3,3',4',5,5',6,6'-nonafluorodiphenyl ether | 85 | 5 | 10 | 165 |
| Ex. 39 | ETFE1 | 0.05 | Pentafluoroanisole | Liquid at room temperature | 5 | 1 | 150 |
| Ex. 40 | ETFE1 | 0.55 | Pentafluorophenylsulfonyl chloride | Liquid at room temperature | 5 | 10 | 155 |
| Ex. 41 | ETFE1 | 0.55 | 3-Cyano-2,5,6-trifluoropyridine | Liquid at room temperature | 5 | 10 | 176 |
| Ex. 42 | ETFE1 | 0.55 | Bis(pentafluorophenyl)carbonate | 50 | 5 | 10 | 156 |
| Ex. 43 | ETFE1 | 0.55 | 3,3,4,4,5,5,6,6,7,7,8,8,8-Tridecafluorooctyl benzoate | Liquid at room temperature | 5 | 10 | 187 |
| Ex. 44 | ETFE1 | 0.05 | 2,2,2-Trifluoroethyl benzoate | Liquid at room temperature | 5 | 1 | 154 |

TABLE 2

| | Fluoro-copolymer | | Solvent such as the fluorinated aromatic compound | | | Polymer concentration | Dissolution temperature |
|---|---|---|---|---|---|---|---|
| | Type | (g) | Compound | Melting point (° C.) | (g) | (mass %) | (° C.) |
| Ex. 45 | ETFE1 | 0.05 | 2,2,3,3,3-Pentafluoropropyl benzoate | Liquid at room temperature | 5 | 1 | 163 |
| Ex. 46 | ETFE1 | 0.05 | 2,2,3,3-Tetrafluoropropyl benzoate | Liquid at room temperature | 5 | 1 | 186 |
| Ex. 47 | ETFE1 | 0.05 | Bis(2,2,2-trifluoroethyl)phthalate | 41 | 5 | 1 | 171 |
| Ex. 48 | ETFE1 | 0.55 | 4-Acetylphenyl trifluoromethanesulfonate | Liquid at room temperature | 5 | 10 | 190 |
| Ex. 49 | ETFE1 | 0.05 | 3',5'-Bis(trifluoromethyl)acetophenone/perfluorobiphenyl (4:1(wt/wt)) | Liquid at room temperature | 5 | 1 | 155 |
| Ex. 50 | ETFE1 | 0.03 | 3',5'-Bis(trifluoromethyl)acetophenone/1,3-bis(trifluoromethyl)benzene (1:1(wt/wt)) | Liquid at room temperature | 5 | 1 | 160 |
| Ex. 51 | ETFE1 | 0.05 | 2,6-Difluorobenzonitrile/benzonitrile (1:1(wt/wt)) | Liquid at room temperature | 5 | 1 | 190 |

TABLE 2-continued

| | Fluoro-copolymer | | Solvent such as the fluorinated aromatic compound | | Polymer concentration | Dissolution temperature |
| --- | --- | --- | --- | --- | --- | --- |
| | Type | (g) | Compound | Melting point (° C.) | (g) | (mass %) | (° C.) |
| Ex. 52 | ETFE1 | 0.05 | 2',3',4',5',6'-Pentafluoroacetophenone/benzonitrile (2:1(wt/wt)) | Liquid at room temperature | 5 | 1 | 190 |
| Ex. 53 | ETFE1 | 0.12 | Pentafluorobenzonitrile/nitrobenzene (3:1(wt/wt)) | Liquid at room temperature | 5 | 2 | 150 |
| Ex. 54 | ETFE1 | 0.05 | Pentafluorobenzonitrile/nitrobenzene (1:1(wt/wt)) | Liquid at room temperature | 5 | 1 | 170 |
| Ex. 55 | ETFE1 | 0.05 | Perfluorobiphenyl/benzonitrile (2:3(wt/wt)) | Liquid at room temperature | 5 | 1 | 190 |
| Ex. 56 | ETFE1 | 0.05 | Perfluorobiphenyl/acetophenone (3:7(wt/wt)) | Liquid at room temperature | 5 | 1 | 200 |
| Ex. 57 | ETFE1 | 0.05 | Perfluorobiphenyl/methyl benzoate (3:7(wt/wt)) | Liquid at room temperature | 5 | 1 | 200 |
| Ex. 58 | ETFE1 | 0.12 | Perfluorobiphenyl/nitrobenzene (3:1(wt/wt)) | Liquid at room temperature | 5 | 2 | 150 |
| Ex. 59 | ETFE1 | 0.26 | 1,3-Bis(trifluoromethyl)benzene | Liquid at room temperature | 5 | 5 | 140 |
| Ex. 60 | ETFE1 | 0.05 | Benzotrifluoride | −29 | 5 | 1 | 150 |
| Ex. 61 | ETFE1 | 0.05 | Hexafluorobenzene | 4 | 5 | 1 | 170 |
| Ex. 62 | ETFE1 | 0.05 | 4-Chlorobenzotrifluoride | Liquid at room temperature | 5 | 1 | 160 |
| Ex. 63 | ETFE1 | 0.05 | Pentafluoropyridine | −42 | 5 | 1 | 140 |
| Ex. 64 | ETFE2 | 0.55 | 2,6-Difluorobenzonitrile | 28 | 5 | 10 | 198 |
| Ex. 65 | ETFE2 | 0.55 | Perfluorobiphenyl | 70 | 5 | 10 | 182 |
| Ex. 66 | ETFE2 | 0.05 | 3-(Trifluoromethyl)benzonitrile | 17 | 5 | 1 | 195 |
| Ex. 67 | ETFE2 | 0.16 | 3,5-Bis(trifluoromethyl)benzonitrile | 21 | 5 | 3 | 185 |
| Ex. 68 | ETFE2 | 0.05 | Ethyl pentafluorobenzoate | Liquid at room temperature | 5 | 1 | 190 |
| Ex. 69 | ETFE2 | 0.55 | Methyl 4-(trifluoromethyl)benzoate | Liquid at room temperature | 5 | 10 | 200 |
| Ex. 70 | ETFE2 | 0.05 | Methyl 3,5-bis(trifluoromethyl)benzoate | Liquid at room temperature | 5 | 1 | 190 |
| Ex. 71 | ETFE2 | 0.12 | 2,2,2-Trifluoroethyl benzoate | Liquid at room temperature | 5 | 2 | 200 |
| Ex. 72 | ETFE2 | 0.05 | Pentafluorophenyl pentanoate | Liquid at room temperature | 5 | 1 | 194 |
| Ex. 73 | ETFE2 | 0.26 | 3',5'-Bis(trifluoromethyl)acetophenone | Liquid at room temperature | 5 | 5 | 200 |
| Ex. 74 | ETFE2 | 0.05 | 2',3',4',5',6'-Pentafluoroacetophenone | Liquid at room temperature | | 1 | 185 |
| Ex. 75 | ETFE2 | 0.55 | 3',5'-Bis(trifluoromethyl)acetophenone/perfluorobiphenyl (4:1(wt/wt)) | Liquid at room temperature | 5 | 10 | 190 |
| Ex. 76 | ETFE2 | 0.05 | 1,3-Bis(trifluoromethyl)benzene | Liquid at room temperature | 5 | 1 | 185 |
| Ex. 77 | ETFE3 | 0.05 | 2,6-Difluorobenzonitrile | 28 | 5 | 1 | 187 |
| Ex. 78 | ETFE3 | 0.05 | 3',5'-Bis(trifluoromethyl)acetophenone | Liquid at room temperature | 5 | 1 | 175 |
| Ex. 79 | ETFE3 | 0.26 | 1,3-Bis(trifluoromethyl)benzene | Liquid at room temperature | 5 | 5 | 160 |
| Ex. 80 | ETFE3 | 0.21 | Benzotrifluoride | −29 | 5 | 4 | 170 |
| Ex. 81 | ETFE3 | 0.21 | Hexafluorobenzene | 4 | 5 | 4 | 185 |
| Ex. 82 | ETFE4 | 0.05 | Perfluorobiphenyl | 70 | 5 | 1 | 182 |
| Ex. 83 | ETFE5 | 0.55 | 2,6-Difluorobenzonitrile | 28 | 5 | 10 | 200 |
| Ex. 84 | ETFE5 | 0.55 | Perfluorobiphenyl | 70 | 5 | 10 | 181 |
| Ex. 85 | ETFE6 | 0.05 | 2,6-Difluorobenzonitrile | 28 | 5 | 1 | 203 |
| Ex. 86 | ETFE6 | 0.55 | Perfluorobiphenyl | 70 | 5 | 10 | 174 |
| Ex. 87 | ETFE7 | 0.05 | 2,6-Difluorobenzonitrile | 28 | 5 | 1 | 200 |
| Ex. 88 | ETFE7 | 0.05 | Perfluorobiphenyl | 70 | 5 | 1 | 146 |

In Tables 1 and 2, the "polymer concentration" means the concentration of the fluorocopolymer.

Application Examples

Now, examples of application of the fluorocopolymer composition of the present invention to formation of a thin film by coating will be described below.

Evaluation of ETFE thin films (thin films) obtained in Application Examples was carried out by the following method.

<Adhesion>

The test of adhesion was carried out with reference to JIS K5600. That is, on a thin film of a fluorocopolymer on a substrate obtained in an Application Example, 11 cuts at right angles at 2 mm intervals were made by a cutter knife to make a grid pattern with 100 cells, a cellophane adhesive tape was strongly bonded on the grid pattern, the end of the tape was held and instantaneously peeled, and the state of the thin film which was not separated and remained on the skin surface was observed. After five peel tests, evaluation was made based on standards ○: no peeling observed at all, Δ: partially peeled, and X: entirely peeled.

<Film Thickness>

The film thickness was measured by Digimatic Indicator ID-C112 manufactured by Mitsutoyo Corporation.

<Contact Angle>

Using automatic contact angle meter DM500 manufactured by Kyowa Interface Science Co., Ltd., contact angles of the surface of the ETFE thin film to water and n-hexadecane were measured.

Application Example 1

In an eggplant flask, 150 mg of ETFE1 as a fluorocopolymer and 15 g of 2,6-difluorobenzonitrile (hereinafter referred to as "solvent 1") as a fluorinated aromatic compound solvent were put and heated to 190° C. with stirring, and dissolution was confirmed. The eggplant flask was put in an inert oven preliminarily heated at 200° C. 30 Minutes later, after a mixture of the fluorocopolymer and the solvent was confirmed to be a uniform solution, a 1 cm square glass plate to be a substrate was put in the same inert oven and heated for 5 minutes. Then, in the inert oven, the fluorocopolymer solution was applied to the glass plate. The door of the inert oven was closed, heating was continued for 15 minutes to evaporate the solvent, thereby to obtain a substrate having a thin film of the fluorocopolymer (ETFE1) formed on the surface.

The above obtained thin film of ETFE1 was visually confirmed to be transparent. Further, by observation of the surface of the obtained ETFE1 thin film by a scanning electron microscope, the ETFE1 thin film was confirmed to be a formed product in the form of a dense film. A scanning electron micrograph of the surface of the obtained ETFE1 thin film is shown in FIG. 1.

Then, the above obtained substrate with the ETFE1 thin film was dipped in water to separate the ETFE1 thin film from the substrate to obtain a film-form formed product of ETFE1. The film thickness of the film-form formed product was about 10 μm.

Application Example 2

A substrate having a thin film of ETFE1 formed on its surface was obtained in the same manner as in Application Example 1 except that the substrate used was changed to a 2 cm square copper plate. The obtained thin film of ETFE1 was visually confirmed to be transparent.

Application Example 3

In an eggplant flask, 150 mg of ETFE1 as a fluorocopolymer and 15 g of solvent 1 as a fluorinated aromatic compound solvent were put and heated to 190° C. with stirring, and dissolution was confirmed. The solution was taken out from the oil bath, and stirring was continued, whereupon a clouded suspension was obtained. This suspension was applied to a 7 cm square Kapton film at room temperature and heated on a hot plate heated at 85° C. for one hour to evaporate the solvent. Then, the hot plate was turned off for cooling, thereby to obtain a substrate having a thin film of ETFE1 formed on the surface.

Figure 2:
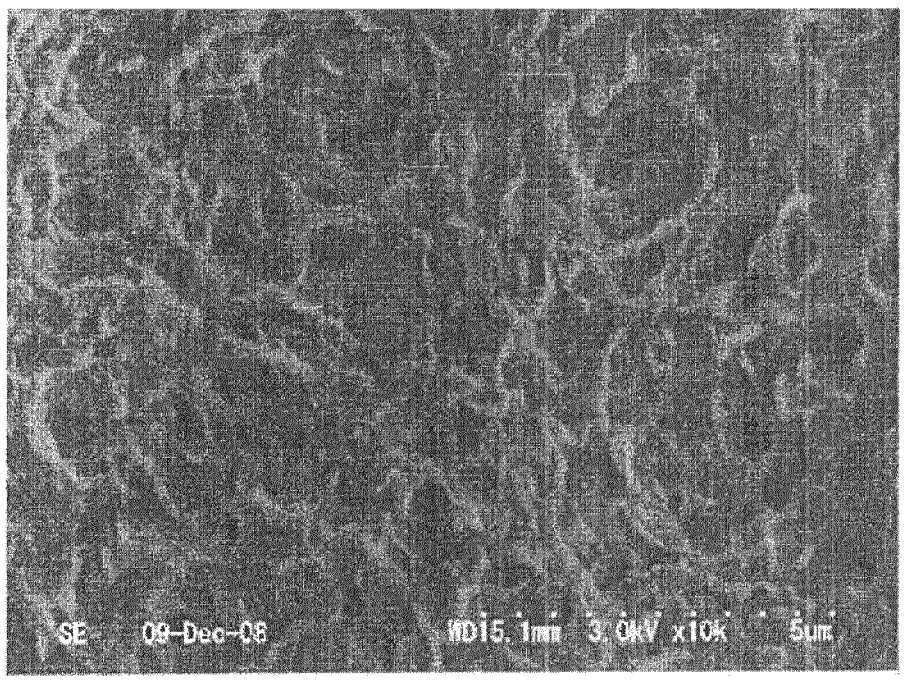
FIG. 2 is a scanning electron micrograph (10,000 magnifications) of the surface of an ETFE thin film obtained in Application Example 3 using the fluorocopolymer composition of the present invention.

The obtained thin film of ETFE1 was visually confirmed to be translucent, and further, by observation by a scanning electron microscope, the thin film was confirmed to be a porous formed product. A scanning electron micrograph of the surface of the obtained ETFE1 thin film is shown in FIG. 2. The film thickness of the ETFE1 thin film was 10 μm. Further, contact angles of the surface of the obtained ETFE1 thin film to water and n-hexadecane were measured. The results are shown in Table 3.

Application Example 4

A substrate having a thin film of ETFE1 formed on the surface was obtained in the same manner as in Example 1 except that the substrate used was changed to a 7 cm square glass plate. The obtained thin film of ETFE1 was visually confirmed to be transparent. Contact angles of the surface of the obtained ETFE1 thin film to water and n-hexadecane were measured. The results are shown in Table 3.

Further, with respect to the obtained glass plate with the ETFE1 thin film, the test of adhesion of the thin film was carried out by the above method. The adhesion was measured by the grid pattern peel test, whereupon about 80% of the thin film was peeled after first peeling, and the thin film was completely peeled after the peeling was repeated five times.

Application Example 5

In an autoclave, 1.0 g of ETFE1 as a fluorocopolymer and 100 g of 1,3-bis(trifluoromethyl)benzene (hereinafter referred to as "solvent 2") as a fluorinated aromatic compound solvent were put and heated to 200° C. with stirring, and after dissolution was confirmed, stirring was continued for 2 hours. The autoclave was taken out from the oil bath, stirring was continued, and when the temperature recovered to room temperature, the content was recovered, whereupon a dispersion having ETFE1 dispersed was obtained. The obtained dispersion was applied to a 7 cm square glass plate at room temperature and heated at 50° C. for 30 minutes and further heated at 100° C. for one hour to remove (dry) the solvent thereby to obtain a substrate having a thin film of ETFE1 formed on the surface.

Figure 3:
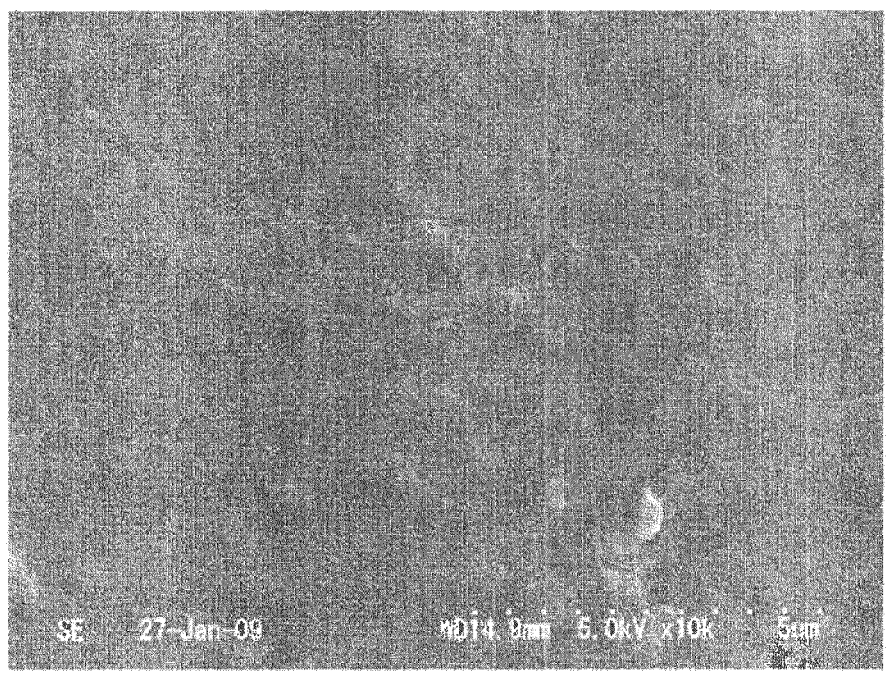
FIG. 3 is a scanning electron micrograph (10,000 magnifications) of the surface of an ETFE thin film obtained in Application Example 5 using the fluorocopolymer composition of the present invention.

The above obtained thin film of ETFE1 was visually confirmed to be translucent, and further by observation by a scanning electron microscope, the thin film was found to be a dense film without pores. A scanning electron micrograph of the surface of the obtained ETFE1 thin film is shown in FIG. 3.

Further, contact angles of the surface of the obtained ETFE1 thin film to water and n-hexanedecane were measured. Further, with respect to the obtained glass plate with the ETFE1 thin film, the adhesion was measured by the above grid pattern peel test, whereupon the thin film was completely peeled after first peeling. The results are shown in Table 3.

Application Example 6

A dispersion having a fluorocopolymer (hereinafter referred to as "ETFE8") dispersed was obtained in the same manner as in the above Application Example 5 except that the fluorocopolymer used was changed to a copolymer having a molar ratio of polymerized units based on tetrafluoroethylene/polymerized units based on $CH_2=CH(CF_2)_2F$/polymerized units based on itaconic anhydride/polymerized units based on ethylene of 57.4/2.3/0.3/39.9. The obtained dispersion was applied to a 7 cm square glass plate at room temperature and heated at 50° C. for 30 minutes and further heated at 100° C. for one hour to remove (dry) the solvent thereby to obtain a substrate having a thin film of ETFE8 formed on the surface.

The above obtained thin film of ETFE8 was visually confirmed to be translucent. Further, contact angles of the surface of the obtained thin film of ETFE8 to water and n-hexadecane were measured. Further, the adhesion was measured by the grid pattern peel test, whereupon the thin film was not peeled at all even after five times of peeling by the tape. The results are shown in Table 3.

Materials used for production of ETFE thin films and results of evaluation of the obtained ETFE thin films in the above Application Examples 1 to 6 are shown in Table 3.

TABLE 3

|  |  | Application Example 1 | Application Example 2 | Application Example 3 | Application Example 4 | Application Example 5 | Application Example 6 |
|---|---|---|---|---|---|---|---|
| Composition | Fluorocopolymer | ETFE1 | ETFE1 | ETFE1 | ETFE1 | ETFE1 | ETFE8 |
|  | Solvent | Solvent 1 | Solvent 1 | Solvent 1 | Solvent 1 | Solvent 2 | Solvent 2 |
|  | Fluorocopolymer concentration (mass %) | 2 | 2 | 2 | 2 | 1 | 1 |
|  | Substrate | Glass plate | Copper plate | Kapton film | Glass plate | Glass plate | Glass plate |
| Production conditions | Application temperature (° C.) | 200 | 200 | Room temperature | 200 | Room temperature | Room temperature |
|  | Drying temperature (° C.) | 200 | 200 | 85 | 200 | 50 | 50 |
| Evaluation results | Adhesion | — | — | — | X | X | ○ |
|  | Film thickness (μm) | 10 | 10 | 10 | 5-15 | 5-15 | 5-15 |
|  | Contact angle to water (degree (°)) | — | — | 136.5 | 104.0 | 120.5 | 123.3 |
|  | Contact angle to n-hexadecane (degree (°)) | — | — | 65.2 | 51.5 | 49.9 | 25.4 |

It is found from Table 3 that an ETFE thin film obtained by using the fluorocopolymer composition of the present invention is excellent in water repellency and is also excellent in oil repellency. Further, with respect to the adhesion of the ETFE thin film to the substrate, it is found that a thin film in Application Example 6 using, as a fluorocopolymer, ETFE comprising tetrafluoroethylene/ethylene/$CH_2$=$CH(CF_2)_2F$/itaconic anhydride is excellent.

INDUSTRIAL APPLICABILITY

With the fluorocopolymer composition of the present invention, a thin film can easily be obtained by coating, and the composition is suitable for application e.g. to surface treatment which requires heat resistance, flame retardancy, chemical resistance, weather resistance, low friction property, low dielectric properties, transparency, etc.

The entire disclosures of Japanese Patent Application No. 2008-266936 filed on Oct. 16, 2008 and Japanese Patent Application No. 2009-156740 filed on Jul. 1, 2009 including specifications, claims, drawings and summaries are incorporated herein by reference in their entireties.

What is claimed is:

1. A fluorocopolymer composition having a dissolution temperature which comprises:

0.1 to 80 mass % of a fluorocopolymer comprising 85-99.9 mol % in total of repeating units based on ethylene and repeating units based on tetrafluoroethylene relative to 100 mol % repeating units in said fluorocopolymer, and 20 to 99.9 mass % of a fluorinated aromatic compound having a melting point of at most 230° C. and having a fluorine content in the compound of from 5 to 75 mass %, wherein said composition forms a solution at said dissolution temperature and wherein said dissolution temperature is less than the melting point of the fluorocopolymer.

2. The fluorocopolymer composition according to claim 1, wherein the content of the fluorocopolymer is from 0.1 to 30 mass % to the total amount of the composition.

3. The fluorocopolymer composition according to claim 1, wherein the fluorinated aromatic compound is a compound represented by the following formula (1):

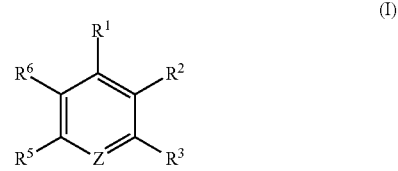

in the formula (I), Z is N or $CR^4$, and each of $R^1$ to $R^6$ (excluding $R^4$ when Z is N) which are independent of one another, is a hydrogen atom, a halogen atom, —$X^1$, —CN, —$NO_2$, —$NX^2_2$, —COOH, —$COOX^3$, —CHO, —$COX^4$, —OH, —$OX^5$, —OCOH, —$OCOX^6$, —$SO_2OH$—, —$SO_2Cl$, —$SO_2F$, —$SO_2H$, —$SO_2X^7$, —$SF_5$, —$OSO_2X^8$ or —$OCOOX^9$; wherein each of $X^1$ to $X^9$ which are independent of one another, is a $C_{1-20}$ alkyl group, an alkenyl group or an alkynyl group, which may be substituted by a halogen group or a hydroxy group, and in which optional —$CH_2$— except for the terminal may be substituted by an oxygen atom, or a phenyl group which may be substituted by a group selected from the above alkyl group, the above alkenyl group, the above alkynyl group and a halogen group; provided that adjacent two among $R^1$ to $R^6$ (excluding $R^4$ when Z is N) may be bonded to form a 5- or 6-membered ring which may be substituted by a group selected from the above alkyl group, the above alkenyl group, the above alkynyl group and a halogen group, and in such a case, the ring may contain a hetero atom selected from an oxygen atom, a nitrogen atom and a sulfur atom as an atom constituting the ring; and the formula (I) has at least one fluorine atom.

4. The fluorocopolymer composition according to claim 3, wherein the fluorinated aromatic compound is a compound of the above formula (I), wherein Z is N or $CR^4$, and each of $R^1$ to $R^6$ (excluding $R^4$ when Z is N) which are independent of one another, is a hydrogen atom, a fluorine atom, a chlorine atom, —$X^1$, —CN, —$NO_2$, —COOH, —$COOX^3$, —$COX^4$, —$OX^5$, —$OCOX^6$, —$SO_2Cl$, —$SF_5$, —$OXO_2X^8$ or —$OCOOX^9$, or adjacent two among them are bonded to form a 6-membered aromatic ring (wherein each of $X^1$ to $X^9$ excluding $X^2$ and $X^7$ which are independent of one another, is a $C_{1-20}$ alkyl group which may be substituted by a halogen group or a hydroxy group, in which optional —$CH_2$— except for the terminal may be substituted by an oxygen atom, or a phenyl group which may be substituted by a group selected from the above alkyl group and a halogen group; the aromatic ring formed by the adjacent two may be substituted by a group selected from the above alkyl group and a halogen group); and is a compound having at least two fluorine atoms in the formula (I).

5. The fluorocopolymer composition according to claim 1, wherein the fluorinated aromatic compound is at least one member selected from the group consisting of a fluorinated benzonitrile, a fluorinated benzoic acid and its ester, a fluorinated polycyclic aromatic compound, a fluorinated nitrobenzene, a fluorinated phenyl alkyl alcohol, a fluorinated phenol and its ester, a fluorinated aromatic ketone, a fluorinated aromatic ether, a fluorinated aromatic sulfonyl compound, a fluorinated pyridine compound, a fluorinated aromatic carbonate, a perfluoroalkyl-substituted benzene, perfluorobenzene, a polyfluoroalkyl ester of benzoic acid, a polyfluoroalkyl ester of phthalic acid, and an aryl ester of trifluoromethanesulfonic acid.

6. The fluorocopolymer composition according to claim 5, wherein the fluorinated aromatic compound has at least two fluorine atoms.

7. The fluorocopolymer composition according to claim 1, which further contains an organic solvent other than the fluorinated aromatic compound.

8. A process for producing the fluorocopolymer composition as defined in claim 1, which comprises a step of dissolving the fluorocopolymer having repeating units based on ethylene and repeating units based on tetrafluoroethylene, in the fluorinated aromatic compound or a mixed organic solvent containing the fluorinated aromatic compound, at a temperature of at most the melting point of the fluorocopolymer.

9. The process for producing the fluorocopolymer composition according to claim 8, wherein the temperature is a temperature lower than the melting point of the fluorocopolymer by at least 30° C.

10. A thin film made of a fluorocopolymer, formed by using the fluorocopolymer polymer composition as defined in claim 1.

11. The fluorocopolymer composition according to claim 1, wherein the fluorinated aromatic compound is a fluorinated benzonitrile.

12. The fluorocopolymer composition according to claim 1, wherein the fluorinated aromatic compound comprises at least one member selected from the group consisting of pentafluorobenzonitrile, 2,3,4,5-tetrafluorobenzonitrile, 2,3,4,6-tetrafluorobenzonitrile, 2,3,5,6-tetrafluorobenzonitrile, 2,3,4-trifluorobenzonitrile, 2,3,5-trifluorobenzonitrile, 2,3,6-trifluorobenzonitrile, 2,4,5-trifluorobenzonitrile, 2,4,6-trifluorobenzonitrile, 3,4,5-trifluorobenzonitrile, 2,3-difluorobenzonitrile, 2,4-difluorobenzonitrile, 2,5-difluorobenzonitrile, 2,6-difluorobenzonitrile, 3,4-difluorobenzonitrile, 3,5-difluorobenzonitrile, 2-fluorobenzonitrile, 3-fluorobenzonitrile, 4-fluorobenzonitrile, 2,4-bis(trifluoromethyl)benzonitrile, 2,5-bis(trifluoromethyl)benzonitrile, 2,6-bis(trifluoromethyl)benzonitrile, 3,5-bis(trifluoromethyl)benzonitrile, 2-(trifluoromethyl)benzonitrile, 3-(trifluoromethyl)benzonitrile, 4-(trifluoromethyl)benzonitrile, 3-fluoro-2-(trifluoromethyl)benzonitrile, 4-fluoro-2-(trifluoromethyl)benzonitrile, 5-fluoro-2-(trifluoromethyl)benzonitrile, 2-fluoro-6-(trifluoromethyl)benzonitrile, 2-fluoro-3-(trifluoromethyl)benzonitrile, 4-fluoro-3-(trifluoromethyl)benzonitrile, 3-fluoro-5-(trifluoromethyl)benzonitrile, 2-fluoro-5-(trifluoromethyl)benzonitrile, 2-fluoro-4-(trifluoromethyl)benzonitrile, 3-fluoro-4-(trifluoromethyl)benzonitrile, (3-cyanophenyl)sulfur pentafluoride, (4-cyanophenyl)sulfur pentafluoride, 2-(trifluoromethoxy)benzonitrile, 3-(trifluoromethoxy)benzonitrile and 4-(trifluoromethoxy)benzonitrile.

13. The fluorocopolymer composition according to claim 1, wherein the fluorinated aromatic compound comprises at least one member selected from the group consisting of pentafluorobenzoic acid, 2,3,4,5-tetrafluorobenzoic acid, 2,3,4,6-tetrafluorobenzoic acid, 2,3,5,6-tetrafluorobenzoic acid, 2,3,4-trifluorobenzoic acid, 2,3,5-trifluorobenzoic acid, 2,3,6-trifluorobenzoic acid, 2,4,5-trifluorobenzoic acid, 2,4,6-trifluorobenzoic acid, 3,4,5-trifluorobenzoic acid, 2,3-difluorobenzoic acid, 2,4-difluorobenzoic acid, 2,5-difluorobenzoic acid, 2,6-difluorobenzoic acid, 3,4-difluorobenzoic acid, 3,5-difluorobenzoic acid, 2-fluorobenzoic acid, 3-fluorobenzoic acid, 4-fluorobenzoic acid, 2,4-bis(trifluoromethyl)benzoic acid, 2,5-bis(trifluoromethyl)benzoic acid, 2,6-bis(trifluoromethyl)benzoic acid, 3,4-bis(trifluoromethyl)benzoic acid, 3,5-bis(trifluoromethyl)benzoic acid, 2-(trifluoromethyl)benzoic acid, 3-(trifluoromethyl)benzoic acid, 4-(trifluoromethyl)benzoic acid, an ester of the fluorinated benzoic acid, perfluorobiphenyl, perfluoronaphthalene, perfluorophenanthrene, 2,2',3,3',5,5',6,6'-octafluorobiphenyl, pentafluoronitrobenzene, 2,3,4,5-tetrafluoronitrobenzene, 2,3,4,6-tetrafluoronitrobenzene, 2,3,5,6-tetrafluoronitrobenzene, 2,3,4-trifluoronitrobenzene, 2,3,5-trifluoronitrobenzene, 2,3,6-trifluoronitrobenzene, 2,4,5-trifluoronitrobenzene, 2,4,6-trifluoronitrobenzene, 3,4,5-trifluoronitrobenzene, 2,3-difluoronitrobenzene, 2,4-difluoronitrobenzene, 2,5-difluoronitrobenzene, 2,6-difluoronitrobenzene, 3,4-difluoronitrobenzene, 3,5-difluoronitrobenzene, 2-fluoronitrobenzene, 3-fluoronitrobenzene, 4-fluoronitrobenzene, 2,3-bis(trifluoromethyl)nitrobenzene, 2,4-bis(trifluoromethyl)nitrobenzene, 2,5-bis(trifluoromethyl)nitrobenzene, 2,6-bis(trifluoromethyl)nitrobenzene, 3,4-bis(trifluoromethyl)nitrobenzene, 3,5-bis(trifluoromethyl)nitrobenzene, 2-(trifluoromethyl)nitrobenzene, 3-(trifluoromethyl)nitrobenzene, 4-(trifluoromethyl)nitrobenzene, 3-(trifluoromethoxy)nitrobenzene, 4-(trifluoromethoxy)nitrobenzene, (3-nitrophenyl)sulfur pentafluoride and (4-nitrophenyl)sulfur pentafluoride, pentafluorobenzyl alcohol, 2,3,4,5-tetrafluorobenzyl alcohol, 2,3,4,6-tetrafluorobenzyl alcohol, 2,3,5,6-tetrafluorobenzyl alcohol, 2,3,4-trifluorobenzyl alcohol, 2,3,5-trifluorobenzyl alcohol, 2,3,6-trifluorobenzyl alcohol, 2,4,5-trifluorobenzyl alcohol, 2,4,6-trifluorobenzyl alcohol, 3,4,5-trifluorobenzyl alcohol, 2,3-difluorobenzyl alcohol, 2,4-difluorobenzyl alcohol, 2,5-difluorobenzyl alcohol, 2,6-difluorobenzyl alcohol, 3,4-difluorobenzyl alcohol, 3,5-difluorobenzyl alcohol, 2-fluorobenzyl alcohol, 3-fluorobenzyl alcohol, 4-fluorobenzyl alcohol, 1-(pentafluorophenyl)ethanol, 1-(2,3,4,5-tetrafluorophenyl)ethanol, 1-(2,3,4,6-tetrafluorophenyl)ethanol, 1-(2,3,5,6-tetrafluorophenyl)ethanol, 1-(2,3,4-trifluorophenyl)ethanol, 1-(2,3,5-trifluorophenyl)ethanol, 1-(2,3,6-trifluorophenyl)ethanol, 1-(2,4,5-trifluorophenyl)ethanol, 1-(2,4,6-trifluorophenyl)ethanol, 1-(3,4,5-trifluorophenyl)ethanol, 1-(2,3-difluorophenyl)ethanol, 1-(2,4-difluorophenyl)ethanol, difluorophenyl)ethanol, 1-(2,6-difluorophenyl)ethanol, 1-(3,4-difluorophenyl)ethanol, 1-(3,5-difluorophenyl)ethanol, 1-(2-fluorophenyl)ethanol, 1-(3-fluorophenyl)ethanol, 1-(4-fluorophenyl)ethanol, 2,4-bis(trifluoromethyl)benzyl alcohol, 2,5-bis(trifluoromethyl)benzyl alcohol, 2,6-bis(trifluoromethyl)benzyl alcohol, 3,4-bis(trifluoromethyl)benzyl alcohol, 3,5-bis(trifluoromethyl)benzyl alcohol, 2-(trifluoromethyl)benzyl alcohol, 3-(trifluoromethyl)benzyl alcohol, 4-(trifluoromethyl)benzyl alcohol, 1-[3,5-bis(trifluoromethyl)phenyl]ethanol, pentafluorophenol, 2,3,5,6-tetrafluorophenol, 2,3,4-trifluorophenol, 2,3,5-trifluorophenol, 2,3,6-trifluorophenol, 3,4,5-trifluorophenol, 2,3-difluorophenol, 2,4-difluorophenol, 2,5-difluorophenol, 2,6-difluorophenol, 3,4-difluorophenol, 3,5-difluorophenol, 2,5-bis(trifluoromethyl)phenol, 3,5-bis(trifluoromethyl)phenol, 2-(trifluoromethyl)phenol, 3-(trifluoromethyl)phenol, 4-(trifluoromethyl)phenol, pentafluorophenyl formate, pentafluorophenyl acetate, pentafluorophenyl propionate, pentafluorophenyl butanoate, pentafluorophenyl pentanoate, 2,3,5,6-tetrafluorophenyl formate, 2,3,5,6-tetrafluorophenyl acetate, 2,3,5,6-tetrafluorophenyl propionate, 2,3,5,6-tetrafluorophenyl butanoate, 2,3,5,6-tetrafluorophenyl pentanoate, 2,3,4-trifluorophenyl formate, 2,3,4-trifluorophenyl acetate, 2,3,4-trifluorophenyl propionate, 2,3,4-trifluorophenyl butanoate, 2,3,4-trifluorophenyl pentanoate, 2,3,5-trifluorophenyl formate, 2,3,5-trifluorophenyl acetate, 2,3,5-trifluorophenyl propionate, 2,3,5-trifluorophenyl butanoate, 2,3,5-trifluorophenyl pentanoate, 2,3,6-trifluorophenyl formate, 2,3,6-trifluorophenyl acetate, 2,3,6-trifluorophenyl propionate, 2,3,6-trifluorophenyl butanoate, 2,3,6-trifluorophenyl pentanoate, 3,4,5-trifluorophenyl formate, 3,4,5-trifluorophenyl acetate, 3,4,5-trifluorophenyl propionate, 3,4,5-trifluorophenyl butanoate, 3,4,5-trifluorophenyl pentanoate, 2,3-difluorophenyl formate, 2,3-difluorophenyl acetate, 2,3-difluorophenyl propionate, 2,3-difluorophenyl butanoate, 2,3-difluorophenyl pentanoate, 2,4-difluorophenyl formate, 2,4-difluorophenyl acetate, 2,4-difluorophenyl propionate, 2,4-difluorophenyl butanoate, 2,4-difluorophenyl pentanoate, 2,5-difluorophenyl formate, 2,5-difluorophenyl acetate, 2,5-difluorophenyl propionate, 2,5-difluorophenyl butanoate, 2,5-difluorophenyl pentanoate, 2,6-difluorophenyl formate, 2,6-difluorophenyl acetate, 2,6-difluorophenyl propionate, 2,6-difluorophenyl butanoate, 2,6-difluorophenyl pentanoate, 3,4-difluorophenyl formate, 3,4-difluorophenyl acetate, 3,4-difluorophenyl propionate, 3,4-difluorophenyl butanoate, 3,4-difluorophenyl pentanoate, 3,5-difluorophenyl formate, 3,5-difluorophenyl acetate, 3,5-difluorophenyl propionate, 3,5-difluorophenyl butanoate, 3,5-difluorophenyl pentanoate, 2,5-bis(trifluoromethyl)phenyl formate, 2,5-bis(trifluoromethyl)phenyl acetate, 2,5-bis(trifluoromethyl)phenyl propionate, 2,5-bis(trifluoromethyl)phenyl butanoate, 2,5-bis(trifluoromethyl)phenyl pentanoate, 3,5-bis(trifluoromethyl)phenyl formate, 3,5-bis(trifluoromethyl)phenyl acetate, 3,5-bis(trifluoromethyl)phenyl propionate, 3,5-bis(trifluoromethyl)phenyl butanoate, 3,5-bis(trifluoromethyl)phenyl pentanoate, 2-(trifluoromethyl)phenyl formate, 2-(trifluoromethyl)phenyl acetate, 2-(trifluoromethyl)phenyl propionate, 2-(trifluoromethyl)phenyl butanoate, 2-(trifluoromethyl)phenyl pentanoate, 3-(trifluoromethyl)phenyl formate, 3-(trifluoromethyl)phenyl acetate, 3-(trifluoromethyl)phenyl propionate, 3-(trifluoromethyl)phenyl butanoate, 3-(trifluoromethyl)phenyl pentanoate, 4-(trifluoromethyl)phenyl formate, 4-(trifluoromethyl)phenyl acetate, 4-(trifluoromethyl)phenyl propionate, 4-(trifluoromethyl)phenyl butanoate, 4-(trifluoromethyl)phenyl pentanoate, 2',3',4',5',6'-pentafluoroacetophenone, 2',3',4',5'-tetrafluoroacetophenone, 2',3',4'-trifluoroacetophenone, 2',3',5'-trifluoroacetophenone, 2',3',6'-trifluoroacetophenone, 2',4',5'-trifluoroacetophenone, 2',4',6'-trifluoroacetophenone, 3',4',5'-trifluoroacetophenone, 2',3'-difluoroacetophenone, 2',4'-difluoroacetophenone, 2',5'-difluoroacetophenone, 2',6'-difluoroacetophenone, 3',4'-difluoroacetophenone, 3',5'-difluoroacetophenone, 2'-fluoroacetophenone, 3'-fluoroacetophenone, 4'-fluoroacetophenone, 2',3'-bis(trifluoromethyl)acetophenone, 2',4'-bis(trifluoromethyl)acetophenone, 2',5'-bis(trifluoromethyl)acetophenone, 2',6'-bis(trifluoromethyl)acetophenone, 3',4'-bis(trifluoromethyl)acetophenone, 3',5'-bis(trifluoromethyl)acetophenone, 2'-(trifluoromethyl)acetophenone, 3'-(trifluoromethyl)acetophenone, 4'-(trifluoromethyl)acetophenone, perfluorobenzophenone, 2,3,4,5,6-pentafluorobenzophenone, 2,2,2-trifluoroacetophenone, pentafluoroanisole, 2,3,5,6-tetrafluoroanisole, 2,3,4-trifluoroanisole, 2,3,6-trifluoroanisole, 2,4,5-trifluoroanisole, 2,4,6-trifluoroanisole, 3,4,5-trifluoroanisole, 2,3-difluoroanisole, 2,4-difluoroanisole, 2,5-difluoroanisole, 2,6-difluoroanisole, 3,4-difluoroanisole, 3,5-difluoroanisole, 2-fluoroanisole, 3-fluoroanisole, 4-fluoroanisole, 3,5-bis(trifluoromethyl)anisole, 2-(trifluoromethyl)anisole, 3-(trifluoromethyl)anisole, 4-(trifluoromethyl)anisole, decafluorodiphenyl ether, 4-bromo-2,2',3,3',4',5,5',6,6'-nonafluorodiphenyl ether, 2,3,5,6-tetrafluoro-1,4-bis(pentafluorophenoxy)benzene, pentafluorophenylsulfonyl chloride, pentafluoropyridine, 4-cyano-2,3,5,6-tetrafluoropyridine, 3-cyano-2,5,6-trifluoropyridine, 3,5-dichloro-2,4,6-trifluoropyridine, bis(pentafluorophenyl) carbonate, methyl pentafluorophenyl carbonate, benzotrifluoride, 2-chlorobenzotrifluoride, 3-chlorobenzotrifluoride, 4-chlorobenzotrifluoride, 1,3-bis(trifluoromethyl)benzene, 1,3,5-tris(trifluoromethyl)benzene, perfluorotoluene, perfluoromesitylene, hexafluorobenzene, 2,2-difluoroethyl benzoate, 2,2,2-trifluoroethyl benzoate, 1,1,1,3,3,3-hexafluoroisopropyl benzoate, 2,2,3,3-tetrafluoropropyl benzoate, 2,2,3,3,3-pentafluoropropyl benzoate, 2,2,3,3,4,4,4-heptafluorobutyl benzoate, 2,2,3,3,4,4,5,5-octafluoropentyl benzoate, 2,2,3,3,4,4,5,5,5-nonafluoropentyl benzoate, 2,2,3,3,4,4,5,5,6,6,6-undecafluorohexyl benzoate, 2,2,3,3,4,4,5,5,6,6,7,7,7-tridecafluoroheptyl benzoate, 2,2,3,3,4,4,5,5,6,6,7,7-dodecafluoroheptyl benzoate, 1H,1H-nonafluoro-3,6-dioxaheptyl benzoate, 2,2,3,3-tetrafluoropropyl benzoate, 1H,1H-tridecafluoro-3,6,9-trioxadecyl benzoate, 3,3,3-trifluoropropyl benzoate, 3,3,4,4,4-pentafluorobutyl benzoate, 3,3,4,4,5,5,5-heptafluoropentyl benzoate, 3,3,4,4,5,5,6,6,6-nonafluorohexyl benzoate, 3,3,4,4,5,5,6,6,7,7,8,8,8-tridecafluorooctyl benzoate, 3,3,4,4,5,5,6,6,7,7,8,8,9,9,10,10,10-heptadecafluorodecyl benzoate, bis(2,2,2-trifluoroethyl)phthalate, bis(2,2,2-trifluoroethyl)isophthalate, bis(2,2,2-trifluoroethyl)terephthalate, bis(2,2,3,3,4,4,5,5,5-nonafluoropentyl)phthalate, bis(2,2,3,3,4,4,5,5,5-nonafluoropentyl)isophthalate, bis(2,2,3,3,4,4,5,5,5-nonafluoropentyl)terephthalate, bis(3,3,4,4,5,5,6,6,7,7,8,8,8-tridecafluorooctyl)phthalate, bis(3,3,4,4,5,5,6,6,7,7,8,8,8-tridecafluorooctyl)isophthalate, bis(3,3,4,4,5,5,6,6,7,7,8,8,8-tridecafluorooctyl)terephthalate, phenyl trifluoromethanesulfonate, 4-methoxyphenyl trifluoromethanesulfonate and 4-acetylphenyl trifluoromethanesulfonate.

14. The fluorocopolymer composition according to claim 1, wherein the fluorinated aromatic compound comprises at least one member selected from the group consisting of pentafluorobenzonitrile, 2,3,4,5-tetrafluorobenzonitrile, 2,3,4,6-tetrafluorobenzonitrile, 2,3,5,6-tetrafluorobenzonitrile, 2,3,4-trifluorobenzonitrile, 2,3,5-trifluorobenzonitrile, 2,3,6-trifluorobenzonitrile, 2,4,5-trifluorobenzonitrile, 2,4,6-trifluorobenzonitrile, 3,4,5-trifluorobenzonitrile, 2,3-difluorobenzonitrile, 2,4-difluorobenzonitrile, 2,5-difluorobenzonitrile, 2,6-difluorobenzonitrile, 3,4-difluorobenzonitrile, 3,5-difluorobenzonitrile, 4-fluorobenzonitrile, 2,4-bis(trifluoromethyl)benzonitrile, 2,5-bis(trifluoromethyl)benzonitrile, 2,6-bis(trifluoromethyl)benzonitrile, 3,5-bis(trifluoromethyl)benzonitrile, 2-(trifluoromethyl)benzonitrile, 3-(trifluoromethyl)benzonitrile, 4-(trifluoromethyl)benzonitrile, (3-cyanophenyl)sulfur pentafluoride, (4-cyanophenyl)sulfur pentafluoride, 2-(trifluoromethoxy)benzonitrile, 3-(trifluoromethoxy)benzonitrile, 4-(trifluoromethoxy)benzonitrile, pentafluorobenzoic acid, methyl pentafluorobenzoate, ethyl pentafluorobenzoate, methyl 2,3,4,5-tetrafluorobenzoate, ethyl 2,3,4,5-tetrafluororobenzoate, methyl 2,3,5,6-tetrafluorobenzoate, ethyl 2,3,5, 6-tetrafluorobenzoate; methyl 2,4,5-trifluorobenzoate, ethyl 2,4,5-trifluorobenzoate, methyl 2,4,6-trifluorobenzoate, ethyl 2,4,6-trifluorobenzoate, methyl 2,4-difluorobenzoate, ethyl 2,4-difluorobenzoate, methyl 2,6-difluorobenzoate, ethyl 2,6-difluorobenzoate, methyl 2,4-bis(trifluoromethyl) benzoate, ethyl 2,4-bis(trifluoromethyl)benzoate, methyl 2,5-bis(trifluoromethyl)benzoate, ethyl 2,5-bis(trifluoromethyl)benzoate, methyl 2,6-bis(trifluoromethyl)benzoate, ethyl 2,6-bis(trifluoromethyl)benzoate, methyl 3,5-bis(trifluoromethyl)benzoate, ethyl 3,5-bis(trifluoromethyl)benzoate, methyl 2-(trifluoromethyl)benzoate, ethyl 2-(trifluoromethyl)benzoate, methyl 3-(trifluoromethyl)benzoate, ethyl 3-(trifluoromethyl)benzoate, methyl 4-(trifluoromethyl)benzoate, ethyl 4-(trifluoromethyl)benzoate, perfluorobiphenyl, perfluoronaphthalene, pentafluoronitrobenzene, 2,3,4,5-tetrafluoronitrobenzene, 2,3,4,6-tetrafluoronitrobenzene, 2,3,5,6-tetrafluoronitrobenzene, 2,3,4-trifluoronitrobenzene, 2,3,5-trifluoronitrobenzene, 2,3,6-trifluoronitrobenzene, 2,4,5-trifluoronitrobenzene, 2,4,6-trifluoronitrobenzene, 3,4,5-trifluoronitrobenzene, 2,3-difluoronitrobenzene, 2,4-difluoronitrobenzene, 2,5-difluoronitrobenzene, 2,6-difluoronitrobenzene, 3,4-difluoronitrobenzene, 3,5-difluoronitrobenzene, 2,3-bis(trifluoromethyl)nitrobenzene, 2,4-bis(trifluoromethyl)nitrobenzene, 2,5-bis(trifluoromethyl)nitrobenzene, 2,6-bis(trifluoromethyl)nitrobenzene, 3,4-bis(trifluoromethyl)nitrobenzene, 3,5-bis(trifluoromethyl)nitrobenzene, 2-(trifluoromethyl)nitrobenzene, 3-(trifluoromethyl)nitrobenzene, 4-(trifluoromethyl)nitrobenzene, (3-nitrophenyl)sulfur pentafluoride, (4-nitrophenyl)sulfur pentafluoride, 3-(trifluoromethoxy)nitrobenzene, 4-(trifluoromethoxy)nitrobenzene, pentafluorobenzyl alcohol, 2,3,4,5-tetrafluorobenzyl alcohol, 2,3,4,6-tetrafluorobenzyl alcohol, 2,3,5,6-tetrafluorobenzyl alcohol, 2,3,4-trifluorobenzyl alcohol, 2,3, 5-trifluorobenzyl alcohol, 2,3,6-trifluorobenzyl alcohol, 2,4, 5-trifluorobenzyl alcohol, 2,4,6-trifluorobenzyl alcohol, 3,4, 5-trifluorobenzyl alcohol, 1-(pentafluorophenyl)ethanol, 1-(2,3,4,5-tetrafluorophenyl)ethanol, 1-(2,3,4,6-tetrafluorophenyl)ethanol, 1-(2,3,5,6-tetrafluorophenyl)ethanol, 1-(2, 3,4-trifluorophenyl)ethanol, 1-(2,3,5-trifluorophenyl)ethanol, 1-(2,3,6-trifluorophenyl)ethanol, 1-(2,4,5-trifluorophenyl)ethanol, 1-(2,4,6-trifluorophenyl)ethanol, 1-(3,4,5-trifluorophenyl)ethanol, 2,4-bis(trifluoromethyl)benzyl alcohol, 2,5-bis(trifluoromethyl)benzyl alcohol, 2,6-bis(trifluoromethyl)benzyl alcohol, 3,4-bis(trifluoromethyl)benzyl alcohol, 3,5-bis(trifluoromethyl)benzyl alcohol, 2-(trifluoromethyl)benzyl alcohol, 3-(trifluoromethyl)benzyl alcohol, 4-(trifluoromethyl)benzyl alcohol, 1-[3,5-bis(trifluoromethyl)phenyl]ethanol, pentafluorophenyl formate, pentafluorophenyl acetate, pentafluorophenyl propionate, pentafluorophenyl butanoate, pentafluorophenyl pentanoate, 2',3',4',5',6'-pentafluoroacetophenone, 2',3',4',5'-tetrafluoroacetophenone, 2',3',4'-trifluoroacetophenone, 2',3',5'-trifluoroacetophenone, 2',3',6'-trifluoroacetophenone, 2',4',5'-trifluoroacetophenone, 2',4',6'-trifluoroacetophenone, 3',4',5'-trifluoroacetophenone, 2',3'-difluoroacetophenone, 2',4'-difluoroacetophenone, 2',5'-difluoroacetophenone, 2',6'-difluoroacetophenone, 3',4'-difluoroacetophenone, 3',5'-difluoroacetophenone, 2',4'-bis(trifluoromethyl)acetophenone, 2',5'-bis(trifluoromethyl)acetophenone, 3',5'-bis(trifluoromethyl)acetophenone, 3'-(trifluoromethyl)acetophenone, perfluorobenzophenone, 2,3,4,5,6-pentafluorobenzophenone, 2,2,2-trifluoroacetophenone, pentafluoroanisole, 3,5-bis(trifluoromethyl)anisole, 2-(trifluoromethyl)anisole, 3-(trifluoromethyl)anisole, 4-(trifluoromethyl)anisole, decafluorodiphenyl ether, 4-bromo-2,2',3, 3',4',5,5',6,6'-nonafluorodiphenyl ether, pentafluorophenylsulfonyl chloride, pentafluoropyridine, 4-cyano-2,3,5,6-tetrafluoropyridine, 3-cyano-2,5,6-trifluoropyridine, bis(pentafluorophenyl)carbonate, methylpentafluorophenylcarbonate, benzotrifluoride, 2-benzotrifluoride, 3-chlorobenzotrifluoride, 4-chlorobenzotrifluoride, 1,3-bis(trifluoromethyl)benzene, hexafluorobenzene, 2,2,2-trifluoroethyl benzoate, 1,1,1,3,3,3-hexafluoroisopropyl benzoate, 2,2,3,3-tetrafluoropropyl benzoate, 2,2,3,3,3-pentafluoropropyl benzoate, 2,2,3,3,4,4,4-heptafluorobutyl benzoate, 2,2,3,3,4,4,5,5-octafluoropentyl benzoate, 2,2,3,3,4,4, 5,5,5-nonafluoropentyl benzoate, 2,2,3,3,4,4,5,5,6,6,6-undecafluorohexyl benzoate, 2,2,3,3,4,4,5,5,6,6,7,7,7-tridecafluoroheptyl benzoate, 2,2,3,3,4,4,5,5,6,6,7,7-dodecafluoroheptyl benzoate, 1H,1H-nonafluoro-3,6-dioxaheptyl benzoate, 2,2,3,3-tetrafluoropropyl benzoate, 1H,1H-tridecafluoro-3,6,9-trioxadecyl benzoate, 3,3,3-trifluoropropyl benzoate, 3,3,4,4,4-pentafluorobutyl benzoate, 3,3,4,4,5,5,5-heptafluoropentyl benzoate, 3,3,4,4,5,5,6,6,6-nonafluorohexyl benzoate, 3,3,4,4,5,5,6,6,7,7,8,8,8-tridecafluorooctyl benzoate, 3,3,4,4,5,5,6,6,7,7,8,8,9,9,10,10,10-heptadecafluorodecyl benzoate, bis(2,2,2-trifluoroethyl) phthalate, bis(3,3,4,4,5,5,6,6,7,7,8,8-tridecafluorooctyl) phthalate and 4-acetylphenyl trifluoromethanesulfonate.

15. The fluorocopolymer composition according to claim 1, wherein the fluorinated aromatic compound comprises at least one member selected from the group consisting of pentafluorobenzonitrile, 2,3,4,5-tetrafluorobenzonitrile, 2,3,5,6-tetrafluorobenzonitrile, 2,4,5-trifluorobenzonitrile, 2,4,6-trifluorobenzonitrile, 3,4,5-trifluorobenzonitrile, 2,3-difluorobenzonitrile, 2,4-difluorobenzonitrile, 2,5-difluorobenzonitrile, 2,6-difluorobenzonitrile, 3,4-difluorobenzonitrile, 3,5-difluorobenzonitrile, 4-fluorobenzonitrile, 3,5-bis(trifluoromethyl)benzonitrile, 2-(trifluoromethyl)benzonitrile, 3-(trifluoromethyl)benzonitrile, 4-(trifluoromethyl)benzonitrile, 2-(trifluoromethoxy)benzonitrile, 3-(trifluoromethoxy)benzonitrile, 4-(trifluoromethoxy)benzonitrile, (3-cyanophenyl)sulfur pentafluoride, (4-cyanophenyl)sulfur pentafluoride, pentafluorobenzoic acid, ethyl pentafluorobenzoate, methyl 2,4-difluorobenzoate, methyl 3-(trifluoromethyl)benzoate, methyl 4-(trifluoromethyl)benzoate, methyl 3,5-bis(trifluoromethyl)benzoate, perfluorobiphenyl, perfluoronaphthalene, pentafluoronitrobenzene, 2,4-difluoronitrobenzene, (3-nitrophenyl)sulfur pentafluoride, pentafluorobenzyl alcohol, 1-(pentafluorophenyl)ethanol, pentafluorophenyl acetate, pentafluorophenyl propionate, pentafluorophenyl butanoate, pentafluorophenyl pentanoate, perfluorobenzophenone, 2,3,4,5,6-pentafluorobenzophenone, 2',3',4',5', 6'-pentafluoroacetophenone, 3',5'-bis(trifluoromethyl)acetophenone, 3'-(trifluoromethyl)acetophenone, 2,2,2-trifluoroacetophenone, pentafluoroanisole, 3,5-bis(trifluoromethyl)anisole, decafluorodiphenyl ether, 4-bromo-2,2',3,3',4',5,5',6,6'-nonafluorodiphenyl ether, pentafluorophenylsulfonyl chloride, pentafluoropyridine, 3-cyano-2,5,6-trifluoropyridine, bis(pentafluorophenyl)carbonate, benzotrifluoride, 4-chlorobenzotrifluoride, 1,3-bis(trifluoromethyl)benzene, hexafluorobenzene, 2,2,2-trifluoroethyl benzoate, 2,2,3,3-tetrafluoropropyl benzoate, 2,2,3,3, 3-pentafluoropropyl benzoate, 3,3,4,4,5,5,6,6,7,7,8,8-tridecafluorooctyl benzoate, bis(2,2,2-trifluoroethyl) phthalate and 4-acetylphenyl trifluoromethanesulfonate.

16. The fluorocopolymer composition according to claim 3, wherein the compound represented by formula (I) has at least two fluorine atoms.

17. The fluorocopolymer composition according to claim 1, wherein the fluorinated aromatic compound is 2,6-difluorobenzonitrile.

18. The fluorocopolymer composition according to claim 1, wherein the molar ratio of repeating units based on tetrafluoroethylene/repeating units based on ethylene is 70/30 to 30/70.

19. The fluorocopolymer composition according to claim 1, wherein the fluorocopolymer comprises repeating units based on ethylene, tetrafluoroethylene and at least one further monomer selected from the group consisting of CF2=CFC1, CF2=CH2, CF2=CFCF3, CF2=CHCF3, a (polyfluoroalkyl) ethylene having a C2-12 fluoroalkyl group, a perfluorovinyl ether, a perfluorovinyl ether comprising a group capable of being converted to a carboxylic acid group or a sulfonic acid group, and an olefin other than ethylene.

20. The fluorocopolymer composition according to claim 1, wherein the fluorocopolymer comprises 90-99.8 mol % in total of repeating units based on ethylene and repeating units based on tetrafluoroethylene relative to 100 mol % repeating units in said fluorocopolymer.

* * * * *